US011909228B2

(12) United States Patent
Tang et al.

(10) Patent No.: US 11,909,228 B2
(45) Date of Patent: Feb. 20, 2024

(54) FOREIGN OBJECT DETECTION METHOD AND APPARATUS, AND WIRELESS CHARGING SYSTEM

(71) Applicant: HUAWEI TECHNOLOGIES CO., LTD., Guangdong (CN)

(72) Inventors: Chunsen Tang, Chongqing (CN); Zhihui Wang, Chongqing (CN); Yaoyi Wang, Chongqing (CN); Pengfei Bai, Chongqing (CN); Zhenzhen Wang, Chongqing (CN); Jiakai Cao, Chongqing (CN); Wei Kuang, Chongqing (CN); Zhixian Wu, Dongguan (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/850,325

(22) Filed: Jun. 27, 2022

(65) Prior Publication Data

US 2022/0416586 A1 Dec. 29, 2022

(30) Foreign Application Priority Data

Jun. 28, 2021 (CN) .......................... 202110721532.4

(51) Int. Cl.
*H02J 50/60* (2016.01)
*H02J 50/10* (2016.01)
(Continued)

(52) U.S. Cl.
CPC ............ *H02J 50/60* (2016.02); *B60L 53/124* (2019.02); *H02J 50/005* (2020.01); *H02J 50/10* (2016.02)

(58) Field of Classification Search
CPC ...... B60L 53/12; B60L 53/124; H02J 50/005; H02J 50/10; H02J 50/12; H02J 50/402; H02J 50/60
See application file for complete search history.

(56) References Cited

U.S. PATENT DOCUMENTS

2013/0154383 A1* 6/2013 Kasturi ............... H04B 5/0037
307/104
2014/0111019 A1 4/2014 Roy et al.
(Continued)

FOREIGN PATENT DOCUMENTS

CN 107070003 A 8/2017
CN 109361271 A 2/2019
(Continued)

*Primary Examiner* — Levi Gannon
(74) *Attorney, Agent, or Firm* — WOMBLE BOND DICKINSON (US) LLP

(57) ABSTRACT

This application provides a foreign object detection method and apparatus, and a wireless charging system. The foreign object detection apparatus includes a coil array and a foreign object detection circuit. The coil array includes at least one coil group, and each coil group includes four detection coils whose locations are symmetrical to each other. The foreign object detection circuit determine an abnormal-value threshold of each coil group based on induction signals of each coil group and that are obtained in a first time period, and detect, based on the abnormal-value threshold and the induction signals of each coil group, whether there is a foreign object; when it is determined that there is no foreign object, detect, based on the signal threshold of each coil group and induction signals that are of each coil group and that are obtained in a second time period, whether there is a foreign object.

22 Claims, 8 Drawing Sheets

(51) Int. Cl.
*B60L 53/124* (2019.01)
*H02J 50/00* (2016.01)

(56) References Cited

U.S. PATENT DOCUMENTS

| | | | | |
|---|---|---|---|---|
| 2016/0276876 | A1* | 9/2016 | Miyashita | H02J 50/90 |
| 2016/0282500 | A1* | 9/2016 | Filippenko | H01F 38/14 |
| 2016/0336760 | A1* | 11/2016 | Yamamoto | H02J 50/402 |
| 2017/0033609 | A1* | 2/2017 | Nakamura | H02J 50/12 |
| 2017/0244288 | A1* | 8/2017 | Kozlowski | H02J 50/60 |
| 2018/0026482 | A1* | 1/2018 | Asano | H02J 50/12 |
| | | | | 307/104 |
| 2019/0103771 | A1* | 4/2019 | Piasecki | H02J 50/10 |
| 2019/0109498 | A1* | 4/2019 | Stingu | H03F 3/217 |
| 2019/0363588 | A1* | 11/2019 | Daetwyler | H02J 50/12 |
| 2020/0076246 | A1* | 3/2020 | Fukuzawa | H01F 27/40 |
| 2020/0350787 | A1 | 11/2020 | Enderlin et al. | |
| 2020/0406860 | A1 | 12/2020 | Mai et al. | |
| 2021/0265871 | A1* | 8/2021 | Chabaan | G01V 3/104 |
| 2023/0016466 | A1* | 1/2023 | Berggren | H02J 50/60 |

FOREIGN PATENT DOCUMENTS

| | | | |
|---|---|---|---|
| CN | 111682654 | A | 9/2020 |
| CN | 107306054 | B | 11/2020 |
| CN | 109001821 | B | 11/2020 |
| CN | 111917196 | A | 11/2020 |
| CN | 112311108 | A | 2/2021 |
| EP | 3093958 | A1 | 11/2016 |
| EP | 3355083 | A1 | 8/2018 |
| WO | 2015129143 | A1 | 9/2015 |
| WO | 2021017500 | A1 | 2/2021 |

* cited by examiner

FOREIGN OBJECT DETECTION METHOD AND APPARATUS, AND WIRELESS CHARGING SYSTEM

CROSS-REFERENCE TO RELATED APPLICATION

This application claims priority to Chinese Patent Application No. 202110721532.4, filed on Jun. 28, 2021, which is hereby incorporated by reference in its entirety.

STATEMENT OF JOINT RESEARCH AGREEMENT

The subject matter and the claimed disclosure were made by or on the behalf of Chongqing University, of Shapingba District, Chongqing, P.R. China and Huawei Technologies Co., Ltd., of Shenzhen, Guangdong Province, P.R. China, under a joint research agreement titled "Dynamic wireless charging for electric vehicles". The joint research agreement was in effect on or before the claimed disclosure was made, and that the claimed disclosure was made as a result of activities undertaken within the scope of the joint research agreement.

TECHNICAL FIELD

This application relates to the field of wireless power transmission technologies, and in particular, to a foreign object detection method and apparatus, and a wireless charging system.

BACKGROUND

With aggravation of an energy shortage and environmental pollution in the modern society, as new energy vehicles, electric vehicles have received widespread attention once launched. An electric vehicle is powered by a vehicle-mounted power supply, and charging methods of the electric vehicle usually include contact charging and wireless charging. Compared with contact charging, wireless charging has advantages such as ease to use, no spark and risk of electric shock, no mechanical wear, and convenience in implementing automatic charging and mobile charging, and may become a mainstream charging mode for electric vehicles in the future.

A wireless power transmission (WPT) system mainly includes a power transmitting apparatus connected to a power source and a power receiving apparatus connected to a load. A transmit coil in the power transmitting apparatus and a receive coil in the power receiving apparatus may transmit energy through electromagnetic induction. There is an air gap between the transmit coil and the receive coil, and a foreign object may enter the air gap. When there is a metal foreign object between the transmit coil and the receive coil, the metal foreign object may heat due to an eddy effect. Consequently, a safety problem such as spontaneous combustion or combustion of another article may occur. Therefore, to ensure safety, it is necessary to perform foreign object detection.

SUMMARY

In view of this, this application provides a foreign object detection method and apparatus, and a wireless charging system, to improve wireless charging safety.

To implement the foregoing objective, according to a first aspect, an embodiment of this application provides a foreign object detection method. The method is applied to a foreign object detection circuit in a foreign object detection apparatus. The foreign object detection apparatus is applied to a wireless charging system, and the foreign object detection apparatus further includes a coil array. The coil array includes at least one coil group, and each coil group includes four detection coils separately wound into a rectangle. The detection coils in the coil array are arranged in a matrix with even quantities of rows and columns. Four detection coils in the coil array whose locations are symmetrical to each other are located in one coil group, and each detection coil is electrically connected to the foreign object detection circuit.

The method includes:

obtaining an induction signal generated by each detection coil in each coil group;

determining an abnormal-value threshold of each coil group based on induction signals that are of each coil group and that are obtained in a first time period, where the first time period is a preset time period after the induction signals start to be obtained; and detecting, based on the abnormal-value threshold and the induction signals of each coil group, whether there is a foreign object in a detection region corresponding to the coil array.

According to the foreign object detection method provided in an embodiment, the foreign object detection apparatus is disposed in the wireless charging system. After charging starts, the induction signal generated by each detection coil is obtained. Then, the abnormal-value threshold of each coil group is determined based on the induction signals that are of each coil group and that are obtained in the first time period. The first time period is the preset time period after the induction signals start to be obtained. Afterwards, it is detected, based on the abnormal-value threshold and the induction signals of each coil group, whether there is a foreign object in the detection region corresponding to the coil array. In this way, when a foreign object is detected, the foreign object can be removed in time, thereby improving wireless charging safety and charging efficiency.

In addition, in this technical solution, the abnormal-value threshold is dynamically determined based on the obtained induction signals, and foreign object detection is performed based on the abnormal-value threshold. In this way, an inherent error (for example, an error caused by an interference factor such as a power adjustment, a concrete layer, or a protective housing) can be incorporated into the abnormal-value threshold, so that an anti-interference capability and environment adaptability of foreign object detection can be improved.

In addition, in this technical solution, foreign object detection is performed based on symmetry of the detection coils in a unit of a coil group. This can reduce algorithm complexity.

In an embodiment of the first aspect, the determining an abnormal-value threshold of each coil group based on induction signals that are of each coil group and that are obtained in a first time period includes:

determining the abnormal-value threshold of each coil group by using an interquartile range method based on signal values of the induction signals that are of each coil group and that are obtained in the first time period.

In an embodiment, the abnormal-value threshold is determined by using the interquartile range method. This can reduce algorithm complexity and improve accuracy of the abnormal-value threshold.

In an embodiment of the first aspect, there are a plurality of coil groups, and the detecting, based on the abnormal-value threshold and the induction signals of each coil group, whether there is a foreign object in a detection region corresponding to the coil array includes:

determining, for each coil group based on the abnormal-value threshold of the coil group, whether the induction signals of the coil group have an abnormal value; and if the induction signals of each coil group each have an abnormal value or each have no abnormal value, determining that there is no foreign object in the detection region corresponding to the coil array; or if induction signals of at least one of the coil groups have an abnormal value, and induction signals of at least one of the coil groups have no abnormal value, determining that there is a foreign object in the detection region corresponding to the coil array.

When an environment exception occurs, for example, when a charging power fluctuates at an initial charging stage, a magnetic field in which the coil array is located may be affected. In an embodiment, an environment exception case is considered during foreign object detection. When the induction signals of each coil group each have an abnormal value, it is considered that an environment exception instead of a foreign object occurs, that is, there is no foreign object in the detection region corresponding to the coil array. In this way, a determined foreign object detection result is more accurate.

In an embodiment of the first aspect, the abnormal-value threshold includes a first threshold and a second threshold greater than the first threshold, and the determining, based on the abnormal-value threshold of the coil group, whether the induction signals of the coil group have an abnormal value includes:

determining whether the induction signals of the coil group have a signal value less than the first threshold or greater than the second threshold; and if the induction signals of the coil group have a signal value less than the first threshold or greater than the second threshold, determining that the induction signals of the coil group have an abnormal value; or if the induction signals of the coil group have no signal value less than the first threshold or greater than the second threshold, determining that the induction signals of the coil group have no abnormal value.

In an embodiment, abnormal-value determining is performed based on the first threshold and the second threshold. Algorithm complexity is low.

In an embodiment of the first aspect, the method further includes:

if there is no foreign object in the detection region corresponding to the coil array, determining, for each coil group, a signal threshold of the coil group based on the induction signals that are of the coil group and that are obtained in the first time period; and detecting, for at least one second time period after the first time period based on the signal threshold of each coil group and induction signals that are of each coil group and that are obtained in the second time period, whether there is a foreign object in the detection region corresponding to the coil array.

In an embodiment, when it is determined that there is no foreign object, the signal threshold is determined based on the induction signals obtained in the first time period, and subsequent foreign object detection is performed based on the signal threshold, thereby increasing a processing speed.

In a first possible implementation of the first aspect, the method further includes:

if it is determined that there is no foreign object in the detection region corresponding to the coil array in the second time period, determining a signal threshold of each coil group based on the induction signals that are of each coil group and that are obtained in the second time period.

In an embodiment, after the signal threshold is determined, the signal threshold may be updated in a subsequent detection process, so that environment adaptability of foreign object detection can be further improved.

In an embodiment of the first aspect, if there is no foreign object in the detection region corresponding to the coil array, and the induction signals of each coil group each have no abnormal value, a signal threshold of each coil group is determined based on the induction signals that are of each coil group and that are obtained in the first time period. In this way, a determined signal threshold is more accurate, so that accuracy of a subsequent foreign object detection result can be improved.

In an embodiment of the first aspect, there are a plurality of types of signal values for the obtained induction signals of the coil group, and each type of signal value has a corresponding signal threshold.

In an embodiment, for each coil group, a plurality of types of signal values of the induction signals are obtained, and foreign object detection is performed based on the plurality of types of signal values. In this way, accuracy of a foreign object detection result can be improved.

In an embodiment of the first aspect, the signal values of the obtained induction signals of the coil group include: an amplitude of each detection coil in the coil group and a phase difference between the detection coils in the coil group. The signal threshold of the coil group includes an amplitude threshold and a phase difference threshold.

An amplitude and a phase of an induction signal of a detection coil can clearly reflect a change status of the induction signal. In an embodiment, foreign object detection is performed by using amplitudes and a phase difference of induction signals of detection coils. This can improve detection sensitivity, and can also facilitate signal obtaining.

In an embodiment of the first aspect, the determining a signal threshold of the coil group based on the induction signals that are of the coil group and that are obtained in the first time period includes:

determining the signal threshold of the coil group by using an averaging method based on the induction signals that are of the coil group and that are obtained in the first time period.

In an embodiment, signal thresholds of various types of signal values are determined by using the averaging method. Algorithm complexity is low.

In an embodiment of the first aspect, there are a plurality of coil groups, and the detecting, based on the signal threshold of each coil group and induction signals that are of each coil group and that are obtained in the second time period, whether there is a foreign object in the detection region corresponding to the coil array includes:

determining, for each coil group based on the signal threshold of the coil group and the induction signals that are of the coil group and that are obtained in the second time period, whether the induction signals of the coil group have an abnormal value; and if the induction signals of each coil group each have no abnormal value or each have an abnormal value, determining that there is no foreign object in the detection region corresponding to the coil array; or if induction signals of at least one of the coil groups have an abnormal value, and induction signals of at least one of the coil groups have no abnormal value, determining that there is a foreign object in the detection region corresponding to the coil array.

When an environment exception occurs, for example, when a parking deviation occurs or a charging power changes, the magnetic field in which the coil array is located may be affected. In an embodiment, an environment exception case is considered during foreign object detection. When the induction signals of each coil group each have an abnormal value, it is considered that an environment exception instead of a foreign object occurs, that is, there is no foreign object in the detection region corresponding to the coil array. In this way, a determined foreign object detection result is more accurate.

In an embodiment of the first aspect, the determining, based on the signal threshold of the coil group and the induction signals that are of the coil group and that are obtained in the second time period, whether the induction signals of the coil group have an abnormal value includes:

determining, for each detection coil in the coil group, an absolute value of a difference between an average value of signal values of the induction signal that is of the detection coil and that is obtained in the second time period and the signal threshold of the coil group; and if the absolute value corresponding to each detection coil in the coil group is less than or equal to a preset value, determining that the induction signals of the coil group have no abnormal value; or if an absolute value corresponding to at least one detection coil in the coil group is greater than the preset value, determining that the induction signals of the coil group have an abnormal value.

In an embodiment, abnormal-value determining is performed based on the absolute value of the difference between the average value of the signal values of the induction signal of the detection coil and the corresponding signal threshold, so that algorithm complexity is low, and accuracy of a determining result is relatively high.

In an embodiment of the first aspect, after the wireless charging system starts to transmit power, the method further includes: outputting an alternating current excitation signal to each detection coil.

In an embodiment, the foreign object detection circuit may provide the alternating current excitation signal to each detection coil, that is, use excitation source-based detection. In this way, strength of the induction signal of each detection coil is mainly subject to an excitation source. This can reduce impact of the environmental magnetic field on detection accuracy, and further improve accuracy of foreign object detection.

In an embodiment of the first aspect, the alternating current excitation signal is successively output to all the coil groups; and/or the alternating current excitation signal is successively output to all the detection coils in each coil group.

In an embodiment, the detection coils in each coil group are successively selected to obtain the induction signals. This can reduce energy consumption.

In a first possible implementation of the first aspect, the method further includes:

before the wireless charging system starts to transmit power, detecting whether there is a foreign object in the detection region corresponding to the coil array; and when it is determined that there is no foreign object in the detection region corresponding to the coil array, controlling the wireless charging system to start to transmit power.

In an embodiment, foreign object detection is performed before charging, and charging is performed when it is determined that there is no foreign object. In this way, wireless charging safety can be further improved.

According to a second aspect, an embodiment of this application provides a foreign object detection apparatus, applied to a wireless charging system. The foreign object detection apparatus includes a coil array and a foreign object detection circuit.

The coil array includes at least one coil group, and each coil group includes four detection coils separately wound into a rectangle. The detection coils in the coil array are arranged in a matrix with even quantities of rows and columns. Four detection coils in the coil array whose locations are symmetrical to each other are located in one coil group, and each detection coil is electrically connected to the foreign object detection circuit.

The foreign object detection circuit is configured to detect, based on an induction signal generated by each detection coil, whether there is a foreign object in a detection region corresponding to the coil array.

In this technical solution provided in an embodiment, the foreign object detection apparatus is disposed in the wireless charging system. The foreign object detection apparatus includes the coil array and the foreign object detection circuit. The foreign object detection circuit may detect, based on the induction signal generated by each detection coil, whether there is a foreign object in the detection region corresponding to the coil array. In this way, when a foreign object is detected, the foreign object can be removed in time, thereby improving wireless charging safety and charging efficiency. In addition, the coil array includes at least one coil group, and four detection coils in the coil array whose locations are symmetrical to each other are located in one coil group. In this way, foreign object detection can be performed based on symmetry of the detection coils in a unit of a coil group. This can reduce algorithm complexity.

In an embodiment of the second aspect, there are a plurality of coil groups. In this way, sensitivity of foreign object detection can be improved.

In an embodiment of the second aspect, the foreign object detection circuit includes an excitation source configured to provide an alternating current excitation signal for the detection coils, and the detection coils are correspondingly connected to the excitation source one by one. In this way, a requirement of the circuit on power supply performance of the excitation source can be reduced.

In an embodiment of the second aspect, turn spacings between the detection coils gradually increase in a direction from an outside to an inner center.

A turn that is in the detection coil and that is closed to an edge corresponds to a relatively large detection region, and a probability that a foreign object is located in an edge region of the detection coil is relatively high. In an embodiment, a turn spacing in the edge region of the detection coil is greater than a turn spacing in a middle region thereof. In this way, detection sensitivity in the edge region of the detection coil can be improved, thereby improving efficiency of foreign object detection. In addition, a turn in the edge region of the detection coil has greater impact on magnetic field strength than a coil in the middle region.

Magnetic field strength increased by adding one turn of coil in the edge region of the detection coil is equivalent to that increased by adding a plurality of turns of coil in the middle region. However, an increase of a quantity of turns of coil may increase an impedance of the detection coil. In a case of increasing same magnetic field strength, increasing a quantity of turns of coil in the middle region causes a higher impedance. Therefore, a smaller turn spacing is used in the edge region of the detection coil, and a larger turn spacing is used in the middle region. This not only can improve detection sensitivity of the detection coil, but also can reduce the impedance of the detection coil, thereby reducing power consumption of the detection coil.

In an embodiment of the second aspect, the foreign object detection circuit is configured to perform the method according to any one of the first aspect or the implementations of the first aspect.

For beneficial effects of an embodiment, refer to the related description in the first aspect. Details are not described herein.

According to a third aspect, an embodiment of this application provides a wireless charging system, including a power transmitting apparatus and a foreign object detection apparatus.

The foreign object detection apparatus includes a coil array and a foreign object detection circuit.

The coil array includes at least one coil group, and each coil group includes four detection coils separately wound into a rectangle. The detection coils in the coil array are arranged in a matrix with even quantities of rows and columns. Four detection coils in the coil array whose locations are symmetrical to each other are located in one coil group, and each detection coil is electrically connected to the foreign object detection circuit.

The foreign object detection circuit includes a signal obtaining unit and a signal processing unit, and the signal processing unit is electrically connected to the signal obtaining unit.

The signal obtaining unit is configured to obtain, under control by the signal processing unit, an induction signal generated by each detection coil in each coil group.

The signal processing unit is configured to: determine an abnormal-value threshold of each coil group based on induction signals that are of each coil group and that are obtained in a first time period, and detect, based on the abnormal-value threshold and the induction signals of each coil group, whether there is a foreign object in a detection region corresponding to the coil array, where the first time period is a preset time period after the induction signals start to be obtained.

In an embodiment of the third aspect, the signal processing unit is configured to:
determine, for each coil group, the abnormal-value threshold of the coil group by using an interquartile range method based on signal values of the induction signals that are of the coil group and that are obtained in the first time period.

In an embodiment of the third aspect, there are a plurality of coil groups, and the signal processing unit is configured to:
determine, for each coil group based on the abnormal-value threshold of the coil group, whether the induction signals of the coil group have an abnormal value; and
if the induction signals of each coil group each have an abnormal value or each have no abnormal value, determine that there is no foreign object in the detection region corresponding to the coil array; or
if induction signals of at least one of the coil groups have an abnormal value, and induction signals of at least one of the coil groups have no abnormal value, determine that there is a foreign object in the detection region corresponding to the coil array.

In an embodiment of the third aspect, the abnormal-value threshold includes a first threshold and a second threshold greater than the first threshold, and the signal processing unit is configured to:
determine whether the induction signals of the coil group have a signal value less than the first threshold or greater than the second threshold; and
if the induction signals of the coil group have a signal value less than the first threshold or greater than the second threshold, determine that the induction signals of the coil group have an abnormal value; or
if the induction signals of the coil group have no signal value less than the first threshold or greater than the second threshold, determine that the induction signals of the coil group have no abnormal value.

In an embodiment of the third aspect, the signal processing unit is further configured to:
if there is no foreign object in the detection region corresponding to the coil array, determine, for each coil group, a signal threshold of the coil group based on the induction signals that are of the coil group and that are obtained in the first time period; and
detect, for at least one second time period after the first time period based on the signal threshold of each coil group and induction signals that are of each coil group and that are obtained in the second time period, whether there is a foreign object in the detection region corresponding to the coil array.

In an embodiment of the third aspect, the signal processing unit is further configured to:
if it is determined that there is no foreign object in the detection region corresponding to the coil array in the second time period, determine a signal threshold of each coil group based on the induction signals that are of each coil group and that are obtained in the second time period.

In an embodiment of the third aspect, the signal processing unit is configured to: if there is no foreign object in the detection region corresponding to the coil array, and the induction signals of each coil group each have no abnormal value, determine a signal threshold of each coil group based on the induction signals that are of each coil group and that are obtained in the first time period.

In an embodiment of the third aspect, there are a plurality of types of signal values for the obtained induction signals of the coil group, and each type of signal value has a corresponding signal threshold.

In an embodiment of the third aspect, the signal values of the obtained induction signals of the coil group include: an amplitude of each detection coil in the coil group and a phase difference between the detection coils in the coil group. The signal threshold of the coil group includes an amplitude threshold and a phase difference threshold.

In an embodiment of the third aspect, the signal processing unit is configured to:
determine the signal threshold of the coil group by using an averaging method based on the induction signals that are of the coil group and that are obtained in the first time period.

In an embodiment of the third aspect, there are a plurality of coil groups, and the signal processing unit is configured to:

determine, for each coil group based on the signal threshold of the coil group and the induction signals that are of the coil group and that are obtained in the second time period, whether the induction signals of the coil group have an abnormal value;

if the induction signals of each coil group each have no abnormal value or each have an abnormal value, determine that there is no foreign object in the detection region corresponding to the coil array; or if induction signals of at least one of the coil groups have an abnormal value, and induction signals of at least one of the coil groups have no abnormal value, determine that there is a foreign object in the detection region corresponding to the coil array.

In an embodiment of the third aspect, the signal processing unit is configured to:

determine, for each detection coil in the coil group, an absolute value of a difference between an average value of signal values of the induction signal that is of the detection coil and that is obtained in the second time period and the signal threshold of the coil group; and if the absolute value corresponding to each detection coil in the coil group is less than or equal to a preset value, determine that the induction signals of the coil group have no abnormal value; or if an absolute value corresponding to at least one detection coil in the coil group is greater than the preset value, determine that the induction signals of the coil group have an abnormal value.

In an embodiment of the third aspect, the foreign object detection circuit further includes an excitation source, and the excitation source is electrically connected to the signal processing unit. The signal processing unit is further configured to: after the wireless charging system starts to transmit power, control the excitation source to output an alternating current excitation signal to each detection coil.

In an embodiment of the third aspect, the signal processing unit is configured to: control the excitation source to successively output the alternating current excitation signal to all the coil groups; and/or successively output the alternating current excitation signal to all the detection coils in each coil group.

In an embodiment of the third aspect, the signal processing unit is further configured to:

before the wireless charging system starts to transmit power, detect whether there is a foreign object in the detection region corresponding to the coil array; and when determining that there is no foreign object in the detection region corresponding to the coil array, control the wireless charging system to start to transmit power.

According to a fourth aspect, an embodiment of the application provides a foreign object detection device, including a memory and a processor. The memory is configured to store a computer program. The processor is configured to perform the method according to any one of the first aspect or the implementations of the first aspect when invoking the computer program.

According to a fifth aspect, an embodiment of this application provides a computer-readable storage medium. A computer program is stored on the computer-readable storage medium. When the computer program is executed by a processor, the method according to any one of the first aspect or the implementations of the first aspect is implemented.

According to a sixth aspect, an embodiment of the application provides a computer program product. When the computer program product runs on an electronic device, the electronic device is enabled to perform the method according to any one of the first aspect or the implementations of the first aspect.

According to a seventh aspect, an embodiment of this application provides a chip system, including a processor. The processor is coupled to a memory, and the processor executes a computer program stored in the memory, so as to implement the method according to any one of the first aspect or the implementations of the first aspect. The chip system may be a single chip or a chip module including a plurality of chips.

It may be understood that, for beneficial effects of the third aspect to the seventh aspect, refer to related descriptions in the first aspect. Details are not described herein again.

DESCRIPTION OF EMBODIMENTS

In a wireless charging system, a metal foreign object or a creature (such as a bird) may enter between a transmit coil and a receive coil. When there is a metal foreign object between the transmit coil and the receive coil, the metal foreign object may heat due to an eddy effect. Consequently, a safety problem such as spontaneous combustion (for example, spontaneous combustion of tin foil may occur due to a high enough temperature) or combustion of another article (heating of a metal causes combustion of a leaf or a scrap of paper on the metal) may occur. If there is a creature between the transmit coil and the receive coil, a high-frequency alternating magnetic field between the transmit coil and the receive coil may cause a certain degree of harm to health of the creature. In addition, presence of the foreign object also affects charging efficiency.

To solve the foregoing problem, the embodiments provide a foreign object detection method and apparatus, and a wireless charging system, to improve wireless charging safety and charging efficiency. The following describes embodiments of this application with reference to the accompanying drawings in embodiments of this application. Terms used in an embodiments of the application are merely used to explain the embodiments of this application, and are not intended to limit this application.

Figure 1:
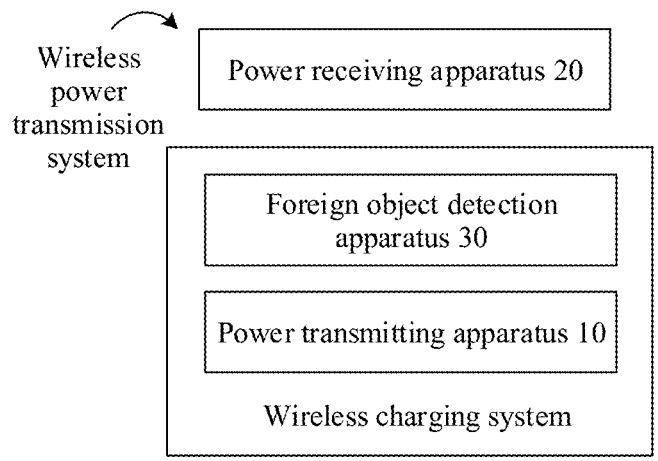
FIG. 1 is a schematic diagram of an architecture of a wireless power transmission system according to an embodiment of this application.

FIG. 1 is a schematic diagram of an architecture of a wireless power transmission system according to an embodiment of this application. As shown in FIG. 1, the wireless power transmission system may include a power transmitting apparatus 10, a power receiving apparatus 20, and a foreign object detection apparatus 30.

Figure 2:
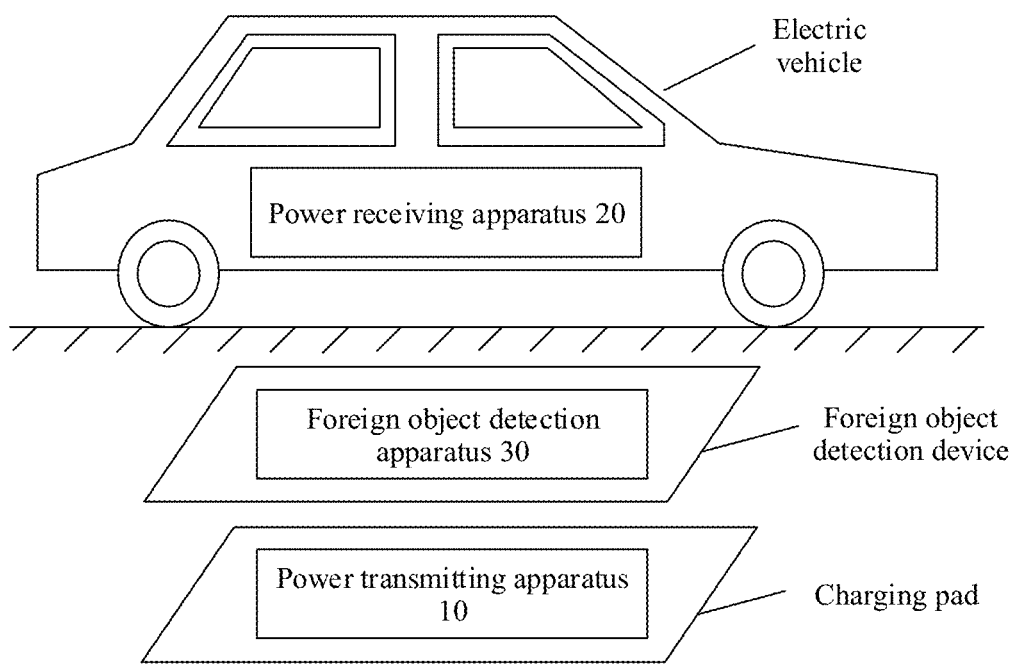
FIG. 2 is a schematic diagram of an application scenario according to an embodiment of this application.
Figure 3:
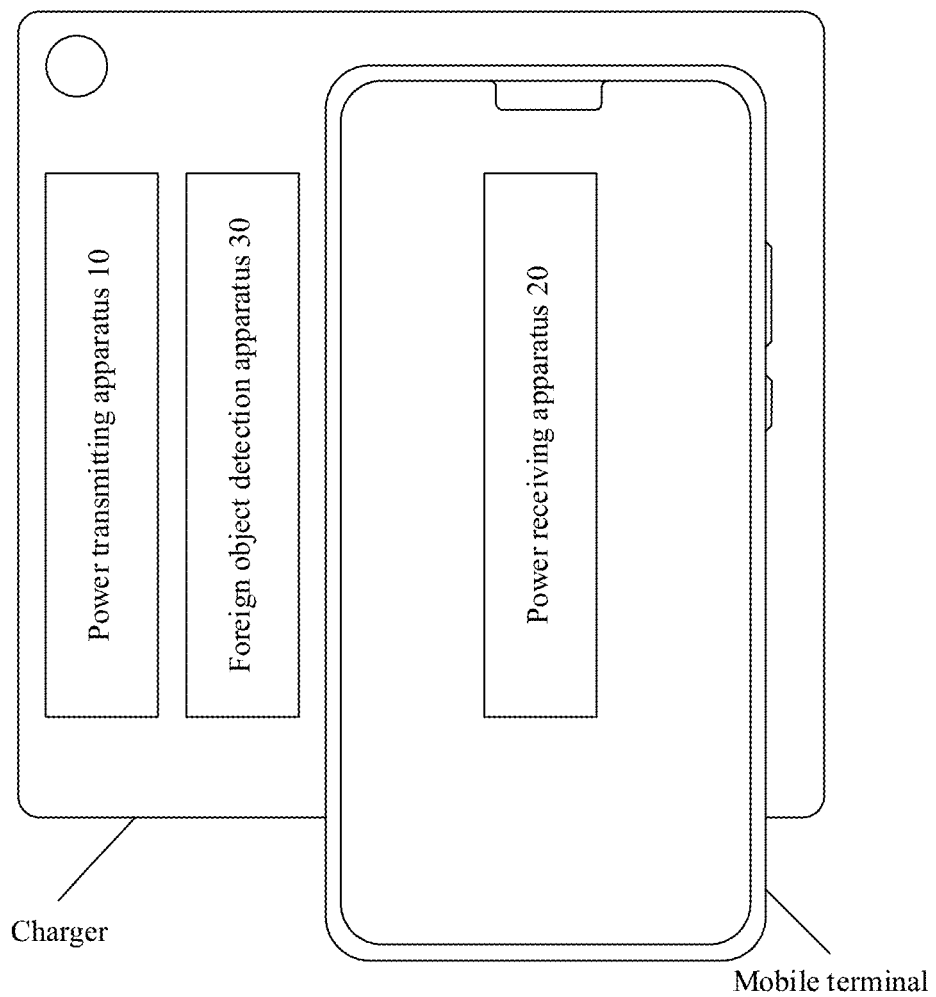
FIG. 3 is a schematic diagram of another application scenario according to an embodiment of this application.

The power receiving apparatus 20 may be disposed in a powered device. FIG. 2 and FIG. 3 show schematic diagrams of two application scenarios of the wireless power transmission system. Referring to FIG. 2 and FIG. 3, the powered device may be an electrically driven vehicle shown in FIG. 2, or may be a mobile terminal shown in FIG. 3. The electrically driven vehicle may be an electric vehicle, an electric bicycle, or the like. In FIG. 2, an electric vehicle is used as an example for illustrative description. In addition, the mobile terminal may be a mobile phone, a tablet computer, an intelligent wearable device, or the like. In FIG. 3, a mobile phone is used as an example for illustrative description.

The power transmitting apparatus 10 is disposed in a charging device. The charging device may be a non-portable charging pad shown in FIG. 2, or may be a portable charger shown in FIG. 3. The charging pad may be disposed in a region such as a wireless charging station, a wireless charging parking space, or a wireless charging road. The charging pad may be disposed on a ground, or may be buried underground. In FIG. 2, an example in which the charging pad is buried underground is used for illustrative description.

It can be understood that, the powered device is not limited to the electrically driven vehicle and the mobile terminal described above, and may be another electronic device supporting wireless charging, for an example, an electric robot. Similarly, the charging device is not limited to the charging pad and the charger described above. Types of the powered device and the charging device are not limited in an embodiment.

The power transmitting apparatus 10 and the power receiving apparatus 20 may transmit energy to each other in an electromagnetic induction manner. The power transmitting apparatus 10 may be connected to a power source, and the power receiving apparatus 20 may be connected to a power supply of a to-be-charged device. After the to-be-charged device enters a wireless charging range of the power transmitting apparatus 10, a wireless charging system is enabled, and the power source may charge the power supply of the to-be-charged device by using the power transmitting apparatus 10 and the power receiving apparatus 20.

In an embodiment, the power transmitting apparatus 10 may include a transmit coil and a transmit control circuit connected to the transmit coil. The transmit coil and resonance elements such as an inductor and a capacitor may constitute a resonance circuit, to improve transmission efficiency. The transmit control circuit may provide a high-frequency alternating current for the transmit coil, so that the transmit coil generates an alternating magnetic field, and transmits energy through the alternating magnetic field.

The transmit control circuit is connected to the power source, and the power source may be an alternating current power supply to reduce complexity of a circuit structure, or may be a direct current power supply to reduce costs. When the power source is a direct current power supply, the transmit control circuit may convert a direct current generated by the power source into a high-frequency alternating current by using an inverter circuit.

The power receiving apparatus 20 may include a receive coil and a receive control circuit connected to the receive coil. The receive coil is coupled to the transmit coil, and may receive energy through the alternating magnetic field generated by the transmit coil, so as to generate an induced current or voltage. The receive control circuit may convert, by using a rectifier circuit or the like, the induced current or voltage generated by the transmit coil into a direct current or voltage, so as to charge the power supply of the to-be-charged device.

It can be understood that, the foregoing only briefly describes the power transmitting apparatus 10 and the power receiving apparatus 20. The power transmitting apparatus 10 and the power receiving apparatus 20 may further include other modules, such as a communication module and a storage module. Structures of the power transmitting apparatus 10 and the power receiving apparatus 20 are not limited in an embodiment.

To improve wireless charging safety and charging efficiency, in an embodiment, the foreign object detection apparatus 30 is disposed between the power transmitting apparatus 10 and the power receiving apparatus 20. The foreign object detection apparatus 30 may be disposed on a power receiving side. Considering that there are many powered devices, to reduce costs and improve convenience in disposing the foreign object detection apparatus 30, as shown in FIG. 1, the foreign object detection apparatus 30 may alternatively be disposed on a charging side, to form the wireless charging system jointly with the power transmitting apparatus 10.

In an embodiment, the power transmitting apparatus 10 and the foreign object detection apparatus 30 may be disposed in different devices. For example, as shown in FIG. 2, the power transmitting apparatus 10 is disposed in the charging pad, and the foreign object detection apparatus 30 is disposed in a foreign object detection device above the charging pad. Alternatively, the power transmitting apparatus 10 and the foreign object detection apparatus 30 may be disposed in a same device. For example, as shown in FIG. 3, the power transmitting apparatus 10 and the foreign object detection apparatus 30 both are disposed in the charger.

It can be understood that, in a wireless charging scenario of an electrically driven vehicle, the power transmitting apparatus 10 and the foreign object detection apparatus 30 may be disposed in a same device, that is, both may be disposed in the charging pad. In FIG. 2, an example in which the power transmitting apparatus 10 and the foreign object detection apparatus 30 are disposed in different devices is used only for illustrative description instead of limiting this application.

Figure 4:
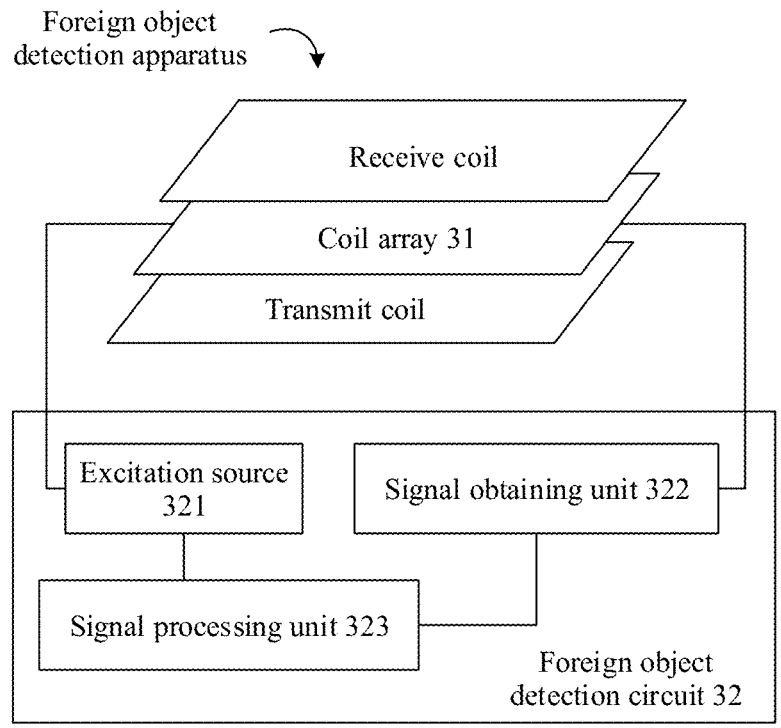
FIG. 4 is a schematic diagram of a structure of a foreign object detection apparatus according to an embodiment of this application.

FIG. 4 is a schematic diagram of a structure of a foreign object detection apparatus according to an embodiment of this application. As shown in FIG. 1 and FIG. 4, the foreign object detection apparatus 30 may include a coil array 31 and a foreign object detection circuit 32.

In an embodiment, as shown in FIG. 4, the coil array 31 may be laid between the transmit coil and the receive coil. A laying plane of the coil array 31 may be parallel to a laying plane of the transmit coil, and a projection of a center of the coil array 31 on the laying plane of the transmit coil may overlap a center of the transmit coil. A coverage area of the coil array 31 may be greater than or equal to a coverage area of the transmit coil, so that foreign object detection can be performed on a detection region corresponding to the entire transmit coil (that is, a projection region of the transmit coil in a direction toward the receive coil). Similar to the power transmitting apparatus 10, the coil array 31 may be disposed on a ground, or may be buried underground.

Figure 5:
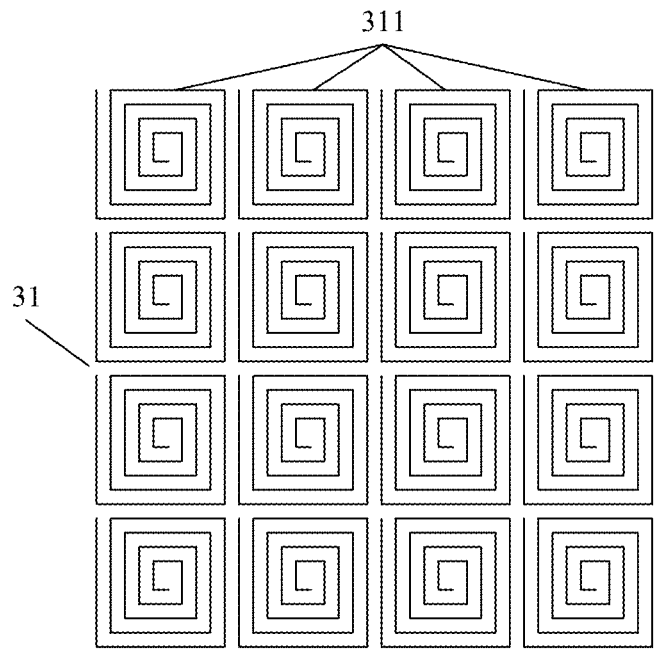
FIG. 5 is a schematic diagram of a structure of a coil array according to an embodiment of this application.

FIG. 5 is a schematic diagram of a structure of a coil array according to an embodiment of this application. As shown in FIG. 5, the coil array 31 may include a plurality of detection coils 311 arranged in a matrix, and the detection coils 311 may have a same material, a same quantity of turns, and a same winding manner. The detection coil 311 may be wound into a rectangular structure, to eliminate a star-shaped coverage hole between circular coils.

The detection coil 311 may be formed by winding a wire, or may be formed by using a printed circuit board (PCB) coil, to reduce an error generated in a coil winding process.

Figure 6:
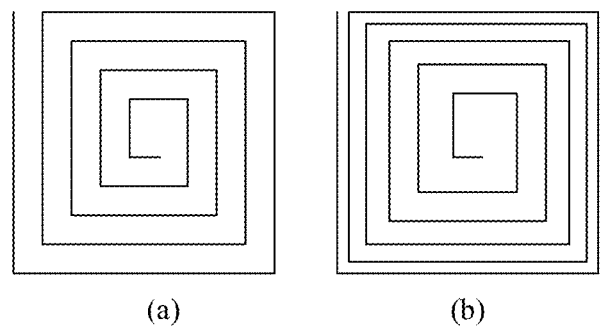
FIG. 6 is a schematic diagram of a structure of a detection coil according to an embodiment of this application.

FIG. 6 is a schematic diagram of a structure of a detection coil according to an embodiment of this application. As shown in (a) in FIG. 6, the detection coil 311 may be a coil structure with uniform turn density, that is, turns are arranged at an equal spacing. This winding manner is relatively simple.

Considering that a turn that is in the detection coil 311 and that is closed to an edge corresponds to a relatively large detection region, and a probability that a foreign object is located in an edge region of the detection coil 311 is relatively high, in an embodiment, a turn spacing in the edge region of the detection coil 311 may be greater than a turn spacing in a middle region thereof. For example, as shown in (b) in FIG. 6, a turn spacing of the detection coil 311 increases progressively outside in. In this way, detection sensitivity in the edge region of the detection coil 311 can be improved. In addition, a turn in the edge region of the detection coil 311 has greater impact on magnetic field strength than a turn in the middle region. Magnetic field strength increased by adding one turn of coil in the edge region of the detection coil 311 is equivalent to that increased by adding a plurality of turns of coil in the middle region. However, an increase of a quantity of turns of coil may increase an impedance of the detection coil 311. In a case of increasing same magnetic field strength, increasing a quantity of turns of coil in the middle region causes a higher impedance. Therefore, a smaller turn spacing is used in the edge region of the detection coil 311, and a larger turn spacing is used in the middle region. This not only can improve detection sensitivity of the detection coil 311, but also can reduce the impedance of the detection coil 311, thereby reducing power consumption of the detection coil 311.

It can be understood that, FIG. 6 is merely an example, and is not used to limit this application. For example, the detection coil 311 may be divided into two parts outside in: an edge region with a first width and a middle region with a second width. Turns in the edge region are arranged at an equal spacing (a first turn spacing), and turns in the middle region are arranged at an equal spacing (a second turn spacing). In an embodiment, an arrangement manner of the detection coil 311 may be selected based on a requirement, and is not limited in an embodiment.

In an embodiment, each detection coil 311 is electrically connected to a foreign object detection circuit 32. The detection coil 311 in the coil array 31 may generate an induction signal due to action of an environmental magnetic field (that is, the magnetic field between the transmit coil and the receive coil). When there is a foreign object in a detection region corresponding to the detection coil 311, the induction signal of the detection coil 311 changes due to the foreign object. Based on this, the foreign object detection circuit 32 may detect, based on the induction signals generated by the detection coils 311, whether there is a foreign object in a detection region corresponding to the coil array 31.

Ideally, the detection coils 311 in the coil array 31 that are symmetrical to each other relative to a row center line or a column center line are subject to basically same strength and distribution that are of an environmental magnetic field. Correspondingly, induction signals generated by these detection coils 311 symmetrical to each other are also basically the same. Foreign object detection may be performed by using this feature, to reduce algorithm complexity. Based on this, in an embodiment, a quantity of rows and a quantity of columns of the detection coils 311 in the coil array 31 each may be an even number. For the foreign object detection apparatus 30 applied to the electrically driven vehicle, at least one of the quantity of rows in the coil array 31 and the quantity of columns in the coil array 31 may be a multiple of four, to improve sensitivity of foreign object detection. In FIG. 5, an example in which the quantity of rows and the quantity of columns each are four is used for illustrative description.

The following is considered: If all induction signals of the detection coils 311 originate from the environmental magnetic field, that is, a magnetic field generated by charging coils (including the transmit coil and the receive coil) is a unique excitation source, when there is no excitation, the foreign object detection apparatus 30 cannot detect an existing foreign object. In addition, when foreign object detection is performed based on symmetry of the detection coils 311, detection accuracy is mainly determined by the environmental magnetic field. However, the strength and the distribution of the environmental magnetic field are non-linear and non-uniform, and may change. These factors may affect accuracy of a detection result. Therefore, in an embodiment, excitation source-based detection may be used, that is, the foreign object detection circuit 32 may provide an alternating current excitation signal to each detection coil 311, so that strength of the induction signal of each detection coil 311 is mainly subject to the excitation signal provided by the foreign object detection circuit 32. This reduces impact of the environmental magnetic field on detection accuracy, and further improves accuracy of foreign object detection. It can be understood that, a main difference between the excitation source-based detection and excitation source-free detection lies in that the induction signal of each detection coil 311 in the excitation source-based detection has stronger strength. Processes of foreign object detection in these two manners are similar. For ease of description, the excitation source-based detection is used as an example for subsequent illustrative description.

After the foreign object detection circuit 32 outputs the alternating current excitation signal to the coil array 31, in addition to being affected by the environmental magnetic field, each detection coil 311 in the coil array 31 is affected by a magnetic field of a surrounding detection coil. As described above, in an embodiment, foreign object detection is performed based on the symmetry of the detection coils. Based on this, a wiring structure used by the detection coil 311 in the coil array 31 may include but is not limited to the following two manners.

In a first manner, referring to FIG. 5, the detection coils 311 in the array have a same wiring structure. For example, as shown in FIG. 5, each detection coil 311 is wound clockwise, and an outer terminal faces upward.

Figure 7:
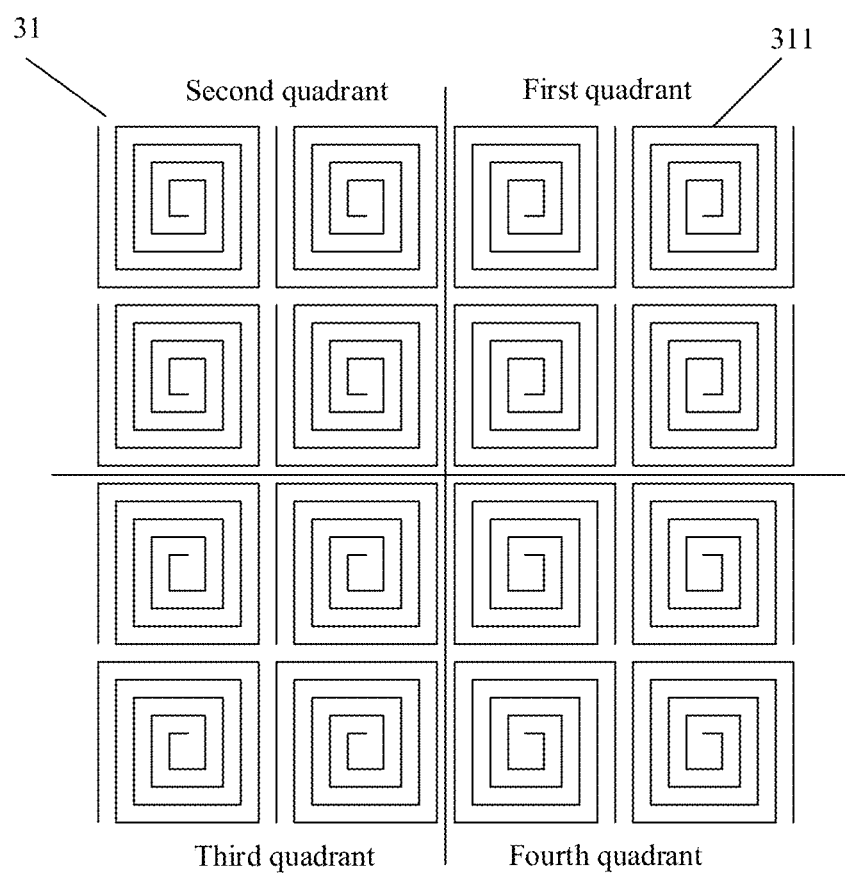
FIG. 7 is a schematic diagram of a structure of another coil array according to an embodiment of this application.

In a second manner, referring to FIG. 7, the coil array 31 may be divided into four quadrants based on the row center line and the column center line of the coil array 31. Detection coils 311 in a same quadrant have a same wiring structure, and wiring structures of the detection coils 311 in adjacent quadrants are symmetrical to each other relative to a center line between the adjacent quadrants.

For example, as shown in FIG. 7, each detection coil 311 in a second quadrant in an upper left corner is wound clockwise, and an outer terminal faces upward. A wiring structure of a detection coil 311 in a first quadrant in an upper right corner is symmetrical to that of the detection coil 311 in the second quadrant relative to the column center line of the coil array 31, each detection coil 311 in the first quadrant is wound counterclockwise, and an outer terminal faces upward. A wiring structure of a detection coil 311 in a third quadrant in a lower left corner is symmetrical to that of the detection coil 311 in the second quadrant relative to the row center line of the coil array 31, each detection coil 311 in the third quadrant is wound counterclockwise, and an outer terminal faces downward. A wiring structure of a detection coil 311 in a fourth quadrant in a lower right corner is symmetrical to that of the detection coil 311 in the third quadrant relative to the column center line of the coil array 31, each detection coil 311 in the fourth quadrant is wound clockwise, and an outer terminal faces downward. The wiring structure of the detection coil 311 in the fourth quadrant is further symmetrical to that of the detection coil 311 in the first quadrant relative to the row center line of the coil array 31.

The wiring structure in the first manner can enable two detection coils 311 in the coil array 31 that are symmetrical to each other relative to the row center line or the column center line of the coil array 31 to be subject to a same environmental magnetic field, and this structure is relatively simple and easy to prepare. The wiring structure in the second manner can enable two detection coils 311 in the coil array 31 that are symmetrical to each other relative to the row center line or the column center line of the coil array 31 to be subject to a same magnetic field of a surrounding detection coil. In actual application, a wiring structure of each detection coil 311 in the coil array 31 may be selected based on a requirement, and is not limited in an embodiment.

As shown in FIG. 4, the foreign object detection circuit 32 may include an excitation source 321, a signal obtaining unit 322, and a signal processing unit 323.

A power source of the excitation source 321 is similar to that of the power transmitting apparatus 10. An alternating current power supply may be directly used to provide an alternating current (that is, an excitation signal) to the detection coil 311. Alternatively, a direct current power supply and an inverter circuit are used, and a direct current generated by the direct current power supply is converted into a high-frequency alternating current by using the inverter circuit, so as to reduce costs. A voltage of the excitation source 321 may be selected based on a requirement, for example, may be 4 V or 12 V.

In an embodiment, when the coil array 31 is connected to the excitation source 321, the detection coils 311 may not be connected in series, so as to avoid impact of a parasitic parameter caused by the serial connection on a detection result. In addition, considering that the excitation source 321 has an upper power limit, the detection coils 311 may not be connected in parallel, that is, each detection coil 311 provides an excitation signal by using an independent excitation source, so as to reduce a requirement of the circuit on the excitation source.

A signal value of the induction signal, of the detection coil 311, that is obtained by the signal obtaining unit 322 may include at least one of the following: a voltage (which may be a valid value, a transient value, a peak value, or an amplitude), a current, an impedance, a phase, or the like.

The signal obtaining unit 322 may collect the induction signal of each detection coil 311, or may obtain the induction signal of each detection coil 311 through another circuit. In an embodiment, an example in which the signal obtaining unit 322 actively collects the induction signal of each detection coil 311 is used for subsequent illustrative description.

The signal processing unit 323 may control the excitation source 321 to provide an excitation signal, and may obtain the induction signal obtained by the signal obtaining unit 322, to perform foreign object detection based on the obtained induction signal.

It can be understood that, a structure of the foreign object detection circuit 32 is not limited to the structure shown in FIG. 4. To improve accuracy of a detection result, the induction signal obtained by the signal obtaining unit 322 may further be amplified, filtered, and then output to the signal processing unit 323, so that the signal processing unit 323 performs foreign object detection by using the induction signal. In other words, the foreign object detection circuit 32 may further include other circuit modules such as a signal amplification circuit and a signal filtering circuit. A circuit structure of the foreign object detection circuit 32 is not limited in this embodiment. Each circuit structure included in the foreign object detection circuit 32 may be implemented in a manner of hardware, software, or a combination of software and hardware, and a plurality of circuit structures may also be integrated in a same component.

When the foreign object detection circuit 32 performs foreign object detection, for each detection coil 311, a signal value of the obtained induction signal of the detection coil 311 may be compared with a preset signal threshold, to determine whether the induction signal of the detection coil 311 is abnormal, and further determine whether there is a foreign object in the detection region corresponding to the detection coil 311.

The following is considered: During use of the wireless charging system, a system parameter may change, for example, charging power is adjusted. The foreign object detection apparatus 30 may also be interfered with by an environment. For example, when the foreign object detection apparatus 30 is buried underground, the coil array 31 may be interfered with by a concrete layer and a protective housing. Consequently, validity of the preset signal threshold decreases, and the signal threshold needs to be changed. However, after the foreign object detection apparatus 30 is packaged and buried underground, the internal preset signal threshold is hard to correct. Based on this, in an embodiment, when foreign object detection is performed, an abnormal-value threshold may be dynamically determined based on the obtained induction signal. In this way, an inherent error (for example, an error caused by an interference factor such as the power adjustment, the concrete layer, or the protective housing described above) can be incorporated into the abnormal-value threshold. Then, foreign object detection is performed based on the abnormal-value threshold, so that an anti-interference capability and environment adaptability of foreign object detection can be improved. To increase a processing speed, when it is determined that there is no foreign object in the detection region corresponding to the coil array 31, a signal threshold may be determined based on the obtained induction signal, and foreign object detection may be performed based on the signal threshold subsequently. The following describes a foreign object detection process.

As described above, in an embodiment, foreign object detection is performed based on the symmetry of the detection coils. The detection coils in the coil array 31 that are symmetrical to each other relative to the row center line or the column center line are subject to substantially same strength and distribution of the environmental magnetic field. Therefore, in an embodiment, four detection coils in the coil array 31 whose locations are symmetrical to each other (that is, two detection coils in the coil array 31 that are symmetrical to each other relative to the row center line and two detection coils that are symmetrical to the foregoing two detection coils relative to the column center line) may serve as one coil group, and foreign object detection is performed in a unit of a coil group. In other words, the four detection coils in each coil group are arranged in a 2×2 array. Two detection coils in a same row of one coil group are symmetrically distributed relative to the column center line of the coil array 31, and two detection coils in a same column of one coil group are symmetrically distributed relative to the row center line of the coil array 31.

Figure 8:
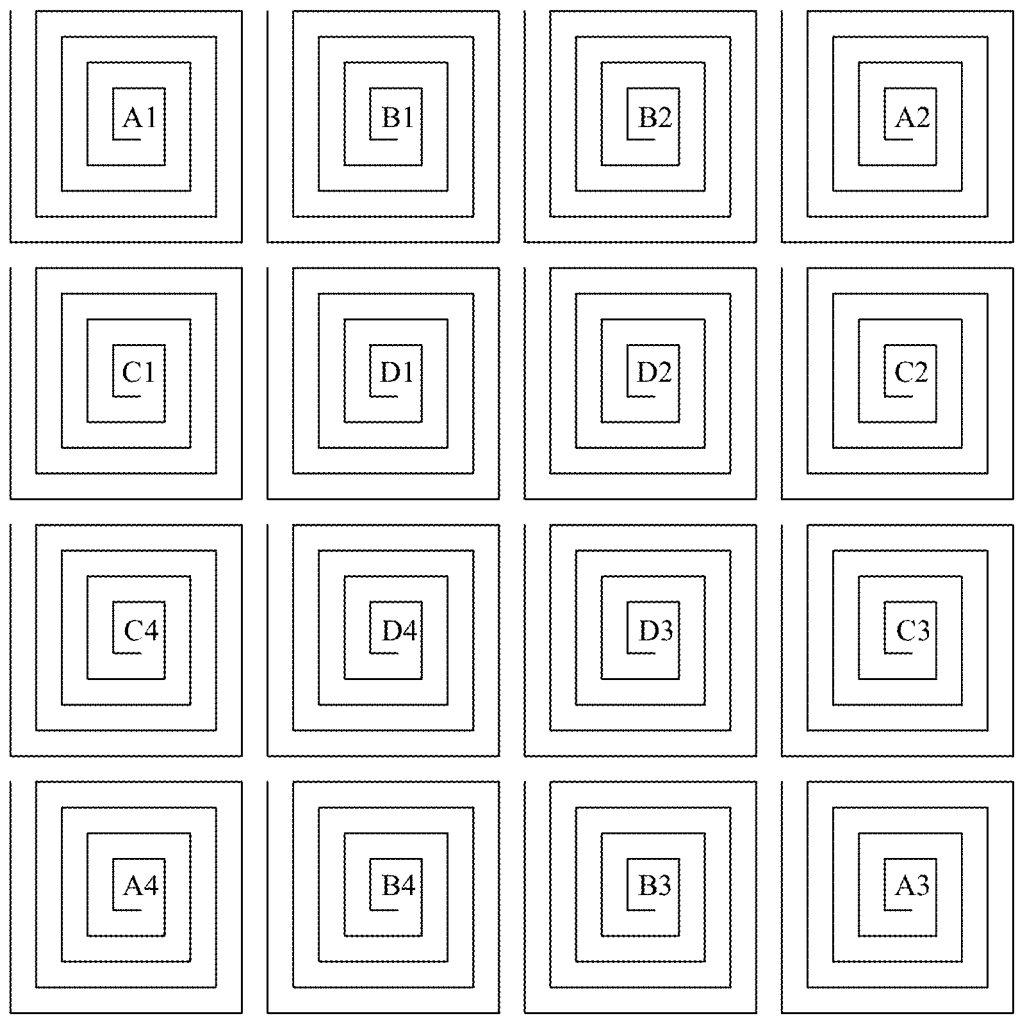
FIG. 8 is a schematic diagram of a coil group division result according to an embodiment of this application.

The coil array 31 shown in FIG. 5 is used as an example, and a coil group division result corresponding to the coil array 31 may be shown in FIG. 8. A coil group A includes detection coils A1, A2, A3, and A4, a coil group B includes detection coils B1, B2, B3, and B4, a coil group C includes detection coils C1, C2, C3, and C4, and a coil group D includes detection coils D1, D2, D3, and D4.

Figure 9:
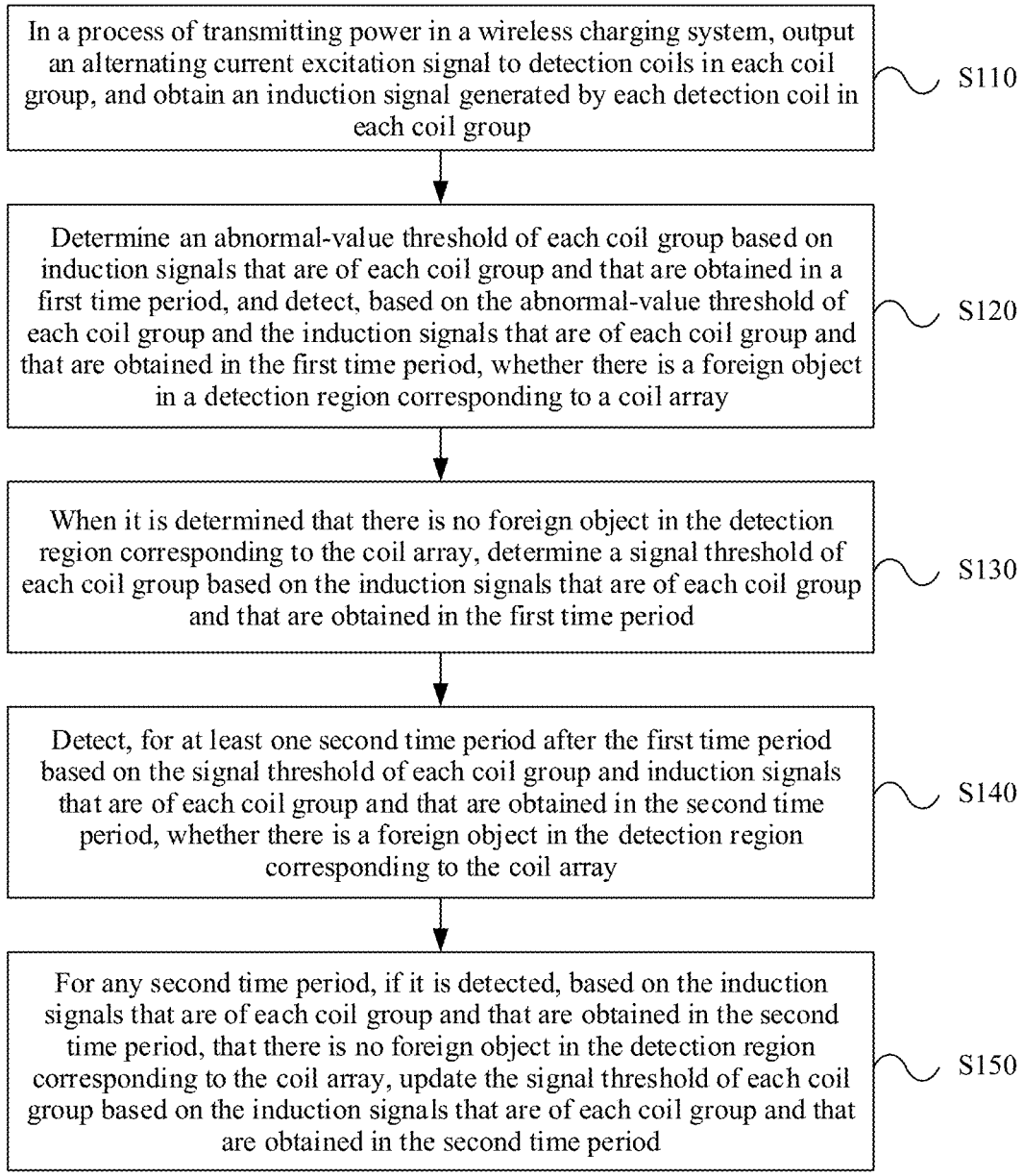
FIG. 9 is a schematic flowchart of a foreign object detection method according to an embodiment of this application.

Based on the foregoing grouping, when foreign object detection is performed in a charging process, for each coil group, a signal threshold of the coil group may be determined at an initial stage based on obtained induction signals of the coil group. At a later stage, foreign object detection may be performed based on the determined signal threshold of each coil group. For a process, refer to FIG. 9. FIG. 9 is a schematic flowchart of a foreign object detection method according to an embodiment of this application. As shown in FIG. 9, the method may include the following operations.

S110. In a process of transmitting power in a wireless charging system, output an alternating current excitation signal to detection coils in each coil group, and obtain an induction signal generated by each detection coil in each coil group.

In an embodiment, when charging starts, a foreign object detection circuit may output a same alternating current excitation signal to each detection coil in the coil array. A signal value of the obtained induction signal of the detection coil may include at least one type of the foregoing signal values, such as a voltage, a current, an impedance, and a phase.

By using a plurality of types of signal values of the induction signal, accuracy of a foreign object detection result can be improved. For example, the signal value of the obtained induction signal of the detection coil includes an amplitude and a phase of the detection coil. Considering that a phase of a single detection coil is hard to collect, and induction signals of detection coils in a same coil group are basically consistent, for each coil group, a phase difference between the detection coils in the coil group may be obtained during obtaining to perform foreign object detection. For example, phase differences between each detection coil in the coil group and the other detection coils in the coil group may be collected, or a phase difference between adjacent detection coils in the coil group may be collected. In other words, for each coil group, the signal value of the obtained detection signal may include: an amplitude of each detection coil in the coil group and a phase difference of each pair of adjacent detection coils in the coil group. This is used as an example in an embodiment for subsequent illustrative description of a foreign object detection process.

For each detection coil, after charging starts, an induction signal in a preset time period (referred to as a first time period herein) may be obtained. In the first time period, there may be a plurality of signal values for the obtained induction signal of each detection coil, so as to improve accuracy of a detection result. The first time period may be preset duration, or may be determined in advance based on a quantity of to-be-obtained signal values of the induction signal, that is, may be duration required for obtaining a preset quantity (for example, 100) of signal values.

In an embodiment, the alternating current excitation signal may be continuously output in parallel to each detection coil. In addition, induction signals generated by the detection coils are collected in parallel, or detection coils in each coil group may be successively selected to collect induction signals. A manner of collecting the induction signals in parallel has higher real-time performance, and a manner of successively collecting the induction signals can reduce power consumption. The manners may be selected based on a requirement in actual application. This is not limited in an embodiment. In an embodiment, the manner of successively collecting the induction signals is used as an example for subsequent illustrative description of a technical solution in this application.

In an embodiment, in the manner of successively collecting the induction signals, coil groups may be successively selected in a preset sequence (referred to as a first preset sequence herein) in the first time period, so that the alternating current excitation signal is output to a selected coil group, and induction signals are collected. For example, for the four coil groups shown in FIG. 8, excitation signal output and induction signal collection may be successively performed on the coil groups according to a sequence of A→B→C→D.

For each coil group, detection coils in the coil group may be successively selected according to a preset sequence (referred to as a second preset sequence herein), so that the alternating current excitation signal is output to a selected detection coil, and an induction signal is collected. For example, for the coil group A, in consideration of collection of phase differences, pairs of detection coils may be successively selected according to a sequence of A1A2→A2A3→A3A4→A4A1, so that excitation signal output and induction signal collection are performed on selected detection coils.

S120. Determine an abnormal-value threshold of each coil group based on induction signals that are of each coil group and that are obtained in the first time period, and detect, based on the abnormal-value threshold of each coil group and the induction signals that are of each coil group and that are obtained in the first time period, whether there is a foreign object in a detection region corresponding to the coil array.

Figure 10:
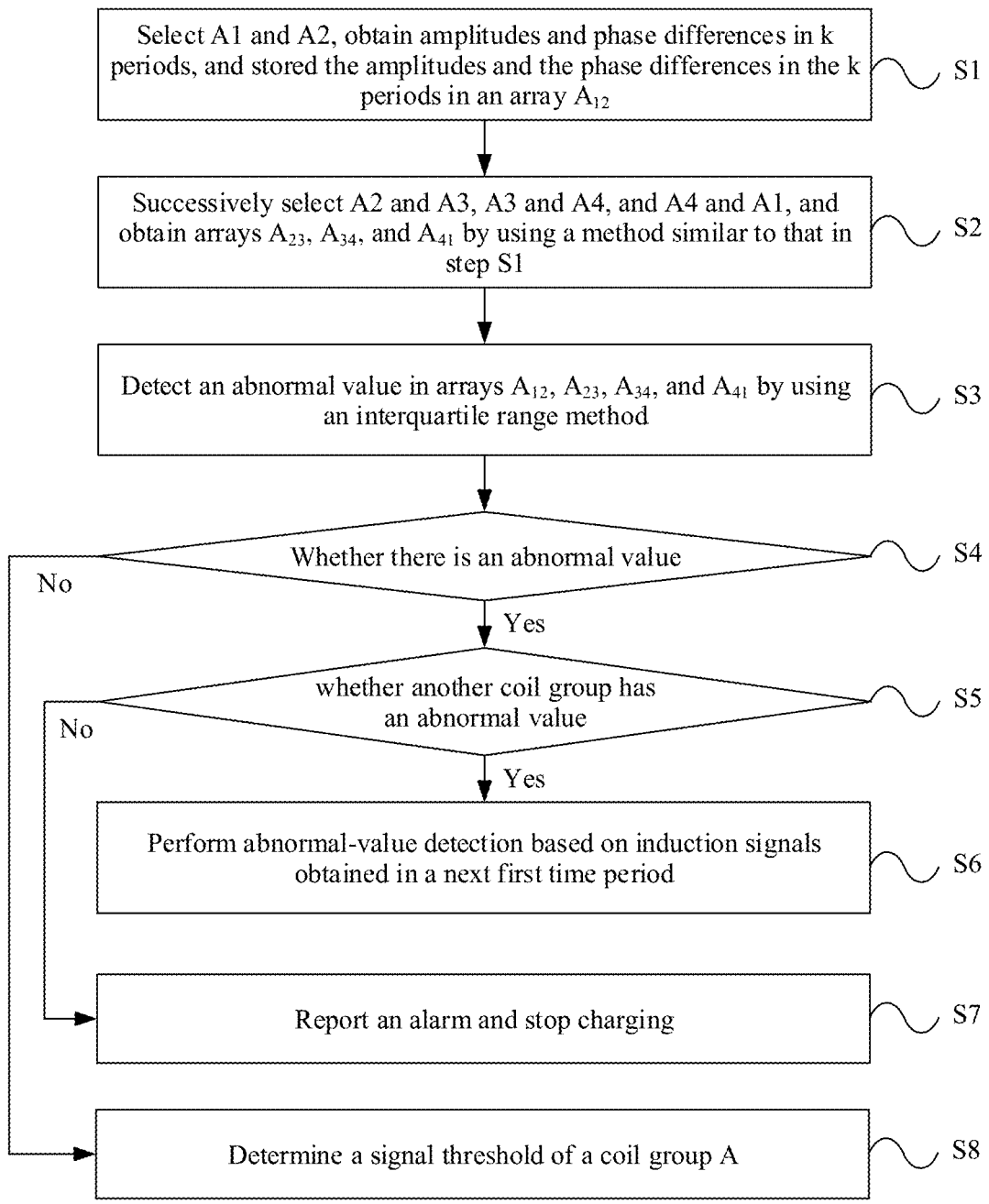
FIG. 10 is a schematic diagram of an exception detection process of a coil group A according to an embodiment of this application.

As described above, for each detection coil, there may be a plurality of signal values for the induction signal that is of the detection coil and that is obtained in the first time period. The coil group A is used as an example. As shown in FIG. 10, when the detection coils A1 and A2 are selected, amplitudes and phase differences in k periods may be obtained, and stored in an array $A_{12}$ (operation S1). In other words, the array $A_{12}$ includes k groups of data, and each group of data includes an amplitude of A1, an amplitude of A2, and a phase difference between A1 and A2. In an embodiment, the phase difference between A1 and A2 may be a difference obtained by subtracting a phase of one of A1 and A2 from a phase of the other of A1 and A2, or may be an absolute value of the phase difference between A1 and A2. Each signal value in the array $A_{12}$ may be labeled, and a corresponding detection coil is identified by using a label.

For each signal value stored in the array $A_{12}$, the signal value may alternatively be determined based on a plurality of sampled values in one sampling period. For example, for the amplitude of A1, sampling may be performed for a plurality of times in each of the k periods, and an average of sampled values is used as the amplitude of A1 that is obtained in the period. In this manner, impact of a circuit signal fluctuation on an obtained result can be reduced.

After all data of the detection coils A1 and A2 is obtained, as described above, A2 and A3, A3 and A4, and A4 and A1 are successively selected. A data obtaining manner of detection coils in the coil group A that are selected at another time is similar to that of the detection coils A1 and A2, and detection coils selected each time correspond to one array. In an embodiment, the detection coils A2 and A3 correspond to an array $A_{23}$, the detection coils A3 and A4 correspond to an array $A_{34}$, and the detection coils A4 and A1 correspond to an array $A_{41}$ (operation S2).

As described above, detection coils in one coil group receive a same alternating current excitation signal, and are subject to substantially same strength and distribution of an environmental magnetic field. Correspondingly, in a normal case, induction signals generated by the detection coils are substantially the same. Based on this, after all signals of the coil group A are obtained, for each type of signal value, data in the arrays $A_{12}$, $A_{23}$, $A_{34}$, and $A_{41}$ that correspond to the coil group A may be aggregated together. An abnormal-value detection algorithm (for example, an interquartile range method) is used to detect an abnormal value in the data (operation S3). Further, it is determined, based on an abnormal-value detection result, whether there is a foreign object in a detection region corresponding to the coil group A.

It can be understood that, the abnormal-value detection algorithm may alternatively be an algorithm other than the interquartile range method, for example, a median method, an averaging method, or a clustering method. The interquartile range method is simple and effective. The following uses this algorithm as an example to describe an abnormal-value detection process for the coil group A.

Based on the foregoing data obtaining manner, each array corresponding to the coil group A includes: 8*k (namely, 8 k) amplitudes (amplitudes in 2*k (namely, 2 k) periods are obtained for each detection coil in the coil group A) and 4*k (namely, 4 k) phase differences.

The amplitude is used as an example. The 8k amplitudes may be sorted in ascending order. Then, an obtained sequence may be divided into four equal parts. A value at a location of a division point is a quartile, and three quartiles may be obtained: a first quartile (Q1), a second quartile (Q2, that is, a median), and a third quartile (Q3). An interquartile range (IQR) is: Q3-Q1.

Based on the IQR, it can be determined that a normal data range is [Q1−n×IQR, Q3+n×IQR]. It may be determined, based on the range, whether there is an abnormal value in the 8 k amplitudes (operation S4). An amplitude that falls outside the range is an abnormal value. In other words, the abnormal-value threshold may include a first threshold (Q1−n×IQR) and a second threshold (Q3+n×IQR), and a signal value that is less than the first threshold or greater than the second threshold is an abnormal value. n may be set based on a sensitivity requirement, for example, may be 1.5

An abnormal-value determining process for the phase differences is similar to that for the amplitudes, and an abnormal-value determining process for another coil group is similar to that for the coil group A. Details are not described herein.

When foreign object determining is performed, in an embodiment, for each coil group, if the induction signals of the coil group have no abnormal value, it can be considered that there is no foreign object in a detection region corresponding to the coil group, or if the induction signals of the coil group have an abnormal value, it can be considered that there is a foreign object in the detection region corresponding to the coil group.

Considering that a case of an environment exception may exist, for example, when a charging power fluctuates at an initial stage after charging starts, a magnetic field in which the coil array is located may be affected by such a case, and consequently, the induction signal of each detection coil in the coil array is affected. Therefore, to improve accuracy of a detection result, in an embodiment, for each coil group, if the induction signals of the coil group have an abnormal value, a working status of another coil group may be checked, that is, whether induction signals of the another coil group also have an abnormal value may be checked (operation S5). If all the induction signals of the coil group each have an abnormal value, it can be considered that an environment exception occurs; or otherwise, it can be considered that there is a foreign object in a detection region corresponding to the coil group. In other words, if the induction signals of each coil group each have an abnormal value, it can be considered that an environment exception occurs, and there is no foreign object in the detection region corresponding to the coil array. If the induction signals of each coil group each have no abnormal value, it can be considered that there is no foreign object in the detection region corresponding to the coil array, and no environment exception occurs. If induction signals of at least one of the coil groups have an abnormal value, and induction signals of at least one of the coil groups have no abnormal value, it can be considered that there is a foreign object in the detection region corresponding to the coil array.

It can be understood that, the foregoing foreign object determining manner is only an example, and is not used to limit this application. In an embodiment, another manner may alternatively be used, for example, foreign object determining is performed with reference to an abnormal-value proportion. This is not limited in an embodiment.

If it is determined that there is no foreign object in the detection region corresponding to the coil array, a subsequent detection process may continue. If an environment exception occurs, that is, the induction signals of all the coil groups each have an abnormal value, induction signals in one another first time period (that is, a next first time period) may be obtained. Abnormal-value detection is performed based on the induction signals obtained in the next first time period (operation S6). If no environment exception occurs, that is, the induction signals of each coil group each have no abnormal value, a subsequent operation may be performed to determine a signal threshold of each coil group (operation S8).

If it is determined that there is a foreign object in the detection region corresponding to the coil array, that is, induction signals of at least one of the coil groups have an abnormal value, and induction signals of at least one of the coil groups have no abnormal value, an alarm may be reported and charging may be stopped (operation S7). Further, it can be determined, based on a detection coil corresponding to the abnormal value, a detection coil whose corresponding detection region has a foreign object. During alarm reporting, a location of the foreign object may be indicated in a voice manner and/or an image display manner. For example, if the abnormal value is an amplitude of the detection coil A1, it indicates that there is a foreign object in a detection region corresponding to the detection coil A1. For another example, if the abnormal value includes the phase difference between the detection coils A1 and A2 and a phase difference between A2 and A3, and both a phase difference between A3 and A4 and a phase difference between A4 and A1 are normal values, it indicates that there is a foreign object in a detection region corresponding to the detection coil A2.

S130. When it is determined that there is no foreign object in the detection region corresponding to the coil array, determine a signal threshold of each coil group based on the induction signals that are of each coil group and that are obtained in the first time period.

In an embodiment, if induction signals of a coil group have no abnormal value, it indicates that there is no foreign object in a region corresponding to the coil group. In this case, a signal threshold of the coil group may be determined. The following still uses the coil group A as an example for description.

As described above, signal values of the induction signals that are of the coil group A and that are obtained in the first time period include an amplitude and a phase difference. For each type of signal value, a signal threshold of this type of signal value may be determined by using an averaging method. For example, all of this type of signal values that are of the coil group A and that are obtained in the first time period may be averaged, and an average value may be used as the signal threshold of this type of signal values. The foregoing example is still used. An amplitude threshold of the coil group A is an average value of the 8 k amplitudes included in the arrays corresponding to the coil group A, and a phase difference threshold of the coil group A is an average value of the 4 k phase differences included in the arrays corresponding to the coil group A.

It can be understood that, the foregoing signal threshold determining method is only a relatively simple method. In actual application, another method such as a weighted averaging method or a median method may alternatively be used to determine the signal threshold. This is not limited in an embodiment.

A signal threshold determining manner of another coil group is similar to that of the coil group A, and details are not described herein. It can be understood that, for each coil group, the signal threshold may be determined when it is determined that the induction signals of the coil group have no abnormal value, or when it is determined that the induction signals of each coil group each have no abnormal value. In this way, if induction signals of another coil group have an abnormal value, there is no need to determine a signal threshold again, thereby saving a processing resource.

S140. Detect, for at least one second time period after the first time period based on the signal threshold of each coil group and induction signals that are of each coil group and that are obtained in the second time period, whether there is a foreign object in the detection region corresponding to the coil array.

After the signal threshold of each coil group is determined, subsequent foreign object detection may be performed based on the signal threshold.

Similar to the signal obtaining process for the first time period, in the second time period, induction signals generated by the detection coils may be collected in parallel, or detection coils in each coil group may be successively selected to collect induction signals. For each detection coil, there may be a plurality of signal values for the induction signal that is of the detection coil and that is obtained in the second time period.

The coil group A is still used as an example. In any second time period, when any pair of adjacent detection coils are selected, amplitudes and phase differences in k' periods may be obtained. Finally, 8 k' amplitudes (amplitudes in 2 k' periods are obtained for each detection coil in the coil group A) and 4 k' phase differences can be obtained. Similar to that in the first time period, a signal value in each period may be an average value of a plurality of corresponding sampled values. k' may be equal to k, or may be less than k, so as to improve detection real-time performance.

After all data of the coil group A is obtained, in an embodiment, each obtained amplitude may be compared with the amplitude threshold of the coil group A, and each obtained phase difference may be compared with the phase difference threshold of the coil group A, so as to determine whether each amplitude and each phase difference are abnormal, and further determine whether the coil group A works abnormally.

In an embodiment, the 2 k' amplitudes of each detection coil or the amplitudes in the k' periods that are obtained in one selection process may be averaged to obtain an average value, which is then compared with the amplitude threshold of the coil group A, and the k' phase differences of each pair of adjacent detection coils may be averaged to obtain an average value, which is then compared with the phase difference threshold of the coil group A, so as to determine whether each average amplitude value and each average phase difference value are abnormal, and further determine whether the coil group A works abnormally. In this way, processing efficiency can be improved, and impact of a circuit signal fluctuation on a detection result can be reduced.

For determining on whether an average value of each type of signal values is abnormal, in an example of amplitudes, it may be determined whether an absolute value of a difference between an average amplitude value and the amplitude threshold exceeds a preset value (referred to as a first preset value herein). If the absolute value exceeds the preset value, it is considered that the average amplitude value is abnormal, that is, there is an abnormal value in the amplitudes corresponding to the average amplitude value. If the average amplitude value does not exceed the preset value, it is considered that the average amplitude value is normal, that is, there is no abnormal value in the amplitudes corresponding to the average amplitude value. The first preset value may be determined based on required detection precision. An exception determining manner for a phase difference is similar to that for an amplitude, and details are not described herein. It can be understood that, exception determining may alternatively be performed in another manner. This is not limited in an embodiment.

If it is determined, based on comparison results, that each average amplitude value and each average phase difference value of the coil group A are both normal, it can be considered that the coil group A works normally; or otherwise, it can be considered that the coil group A works abnormally.

An exception determining process of another coil group is similar to that of the coil group A, and details are not described herein.

Similar to the foreign object detection process corresponding to the first time period, in an embodiment, when foreign object determining is performed for each coil group, if the coil group works normally, it can be considered that there is no foreign object in the detection region corresponding to the coil group, or if the coil group works abnormally, it can be considered that there is a foreign object in the detection region corresponding to the coil group.

Considering that a case of an environment exception may exist, for example, when a parking deviation occurs or a charging power changes, a magnetic field in which the coil array is located may be affected by such a case. Therefore, to improve accuracy of a detection result, in an embodiment, for each coil group, if the coil group works abnormally, a working status of another coil group may be checked. If all coil groups work abnormally, it can be considered that an environment exception occurs; or otherwise, it can be considered that there is a foreign object in the detection region corresponding to the coil group. In other words, if each coil group works normally or works abnormally, that is, the induction signals of each coil group each have no abnormal value or each have an abnormal value, it can be considered that there is no foreign object in the detection region corresponding to the coil array. If at least one of the coil groups works normally, and at least one of the coil groups works abnormally, that is, induction signals of at least one of the coil groups have an abnormal value, and induction signals of at least one of the coil groups have no abnormal value, it can be considered that there is a foreign object in the detection region corresponding to the coil array.

Similar to the foreign object detection process corresponding to the first time period, the foregoing foreign object determining manner is only an example, and is not used to limit this application. In an embodiment, another manner may alternatively be used, for example, foreign object determining is performed with reference to an abnormal-value proportion. This is not limited in an embodiment.

If it is determined that there is no foreign object in the detection region corresponding to the coil array, induction signals in a next second time period may be further obtained, to perform foreign object detection. If it is determined that there is a foreign object in the detection region corresponding to the coil array, an alarm may be reported and charging may be stopped. Further, it can be determined, based on a detection coil corresponding to the abnormal value, a detection coil whose corresponding detection region has a foreign object. During alarm reporting, a location of the foreign object may be indicated in a voice manner and/or an image display manner.

It can be understood that, when it is determined, based on the first time period, that there is no foreign object in the detection region corresponding to the coil array, the foreign object detection method used in operation S120 may be further used. When foreign object detection is performed based on the signal threshold, the algorithm is simpler, and a case in which there is a foreign object in a center location of the coil array may be effectively detected. In an embodiment, when there is a foreign object in the center location of the coil array, impact on the four surrounding detection coils is basically the same. If the abnormal-value detection algorithm such as the interquartile range method is still used to perform foreign object detection, an exception cannot be detected. If foreign object detection is performed by using the signal threshold, it can be effectively determined that each detection coil in the middle coil group works abnormally, so that it is determined that there is a foreign object in the center location of the coil array.

In addition, when foreign object detection is performed, an amplitude may be replaced with an amplitude difference. Correspondingly, the amplitude threshold of the coil group in operation S130 is correspondingly replaced with an amplitude difference threshold. When an environment exception occurs, whether the induction signals of each detection coil have an abnormal value may be more effectively determined by using an amplitude, so that accuracy of a foreign object detection result can be improved.

S150. For any second time period, if it is detected, based on the induction signals that are of each coil group and that are obtained in the second time period, that there is no foreign object in the detection region corresponding to the coil array, update the signal threshold of each coil group based on the induction signals that are of each coil group and that are obtained in the second time period.

After a signal threshold is determined, the signal threshold may also be updated in a subsequent detection process, to further improve environment adaptability of foreign object detection.

In an embodiment, for each second time period, if it is determined, after foreign object detection is completed, that there is no foreign object in the detection region corresponding to the coil array, the signal threshold of each coil group may be updated, or the signal threshold of each coil group may be updated only when an environment exception occurs. In other words, for a second time period, if it is determined that there is no foreign object in the detection region corresponding to the coil array and no environment exception occurs, the signal threshold of each coil group does not need to be updated, so as to save a processing resource.

During an update, in an example of the amplitude threshold of the coil group A, after foreign object detection is completed based on induction signals obtained in a second time period, averaging or weighted averaging may be performed on amplitudes that are of the coil group A and that are obtained in the second time period and the amplitude threshold, and an obtained result is used as an updated amplitude threshold. A method for updating a phase difference threshold and a signal threshold of another coil group is similar to the foregoing method for updating the amplitude threshold, and details are not described herein. It can be understood that, the method for updating a signal threshold is not limited to the foregoing method. The foregoing updating method is merely an example, and is not used to limit this application. The method for updating a signal threshold in an embodiment is not limited.

To further improve wireless charging safety, in an embodiment, before the transmit coil transmits power to the receive coil, whether there is a foreign object in the detection region corresponding to the coil array may be detected. When it is determined that there is no foreign object in the detection region corresponding to the coil array, the transmit coil is then controlled to transmit power to the receive coil.

A foreign object detection method used before charging may be similar to the foreign object detection method used in the first time period, that is, foreign object detection may be performed by using a method such as the interquartile range method. For a detection process, refer to the related description in operation S120. A difference lies in that an environment exception may be not considered when foreign object detection is performed. In an embodiment, for each coil group, if the induction signals of the coil group each have no abnormal value, it can be considered that there is no foreign object in the detection region corresponding to the coil group, or if the induction signals of the coil group have an abnormal value, it can be considered that there is a foreign object in the detection region corresponding to the coil group.

It is considered that the following case may exist before the detection system is started: There is a large (an area is greater than a coverage region of the coil array) symmetrical metal foreign object such as an aluminum plate in the detection region corresponding to the coil array. This causes a same amount of change to induction signals of detection coils in a same coil group. Based on this, in an embodiment, the foreign object detection circuit may also pre-store a set of signal values (referred to initial values herein) of induction signals of each coil group in an ideal case (that is, a case that charging has not started and there is no foreign object in the environment). When foreign object detection is performed before charging, for each coil group, signal values of the induction signals of the coil group may be compared with the corresponding initial values, to determine whether the induction signals of the coil group have an abnormal value. If the induction signals of the coil group each have no abnormal value, it can be determined that there is no foreign object in the detection region corresponding to the coil group.

Similar to the signal threshold, each type of signal values of the induction signals of each coil group have a corresponding initial value. In an embodiment, determining on whether the induction signals of the coil group have an abnormal value is similar to the determining, based on the signal threshold, whether the induction signals have an abnormal value in operation S140. Still using an example of amplitudes, for a coil group, it may be determined whether an absolute value of a difference between an average value of the amplitudes of the coil group and a corresponding initial value exceeds a preset value (referred to as a second preset value herein). If the absolute value exceeds the preset value, it is considered that there is an abnormal value in the amplitudes of the coil group. If the absolute value does not exceed the preset value, it is considered that there is no abnormal value in the amplitudes of the coil group. The second preset value may be greater than the first preset value. An exception determining manner for a phase difference is similar to that for an amplitude, and details are not described herein.

If there is no abnormal value in both the amplitudes and phase differences of the coil group, it can be determined that there is no foreign object in a detection region corresponding to the coil group; or otherwise, it can be considered that there is a foreign object in the detection region corresponding to the coil group.

It can be understood that, another manner may alternatively be used to determine whether the induction signals of the coil group are normal. This is not limited in an embodiment.

One of ordinary skilled in the art can understand that the foregoing embodiments are examples and are not intended to limit this application. In a possible case, an execution sequence of one or more of the foregoing operations may be adjusted, or one or more of the operations may be selectively combined to obtain one or more other embodiments. A person skilled in the art may randomly select a combination from the foregoing operations based on a requirement, and any combination that does not depart from essence of the solutions of this application falls within the protection scope of this application.

According to the foreign object detection method provided in an embodiment, a foreign object detection apparatus is disposed in the wireless charging system. After charging starts, the induction signal generated by each detection coil is obtained. Then, the abnormal-value threshold of each coil group is determined based on the induction signals that are of each coil group and that are obtained in the first time period. The first time period is a preset time period after the induction signals start to be obtained. Afterwards, it is detected, based on the abnormal-value threshold and the induction signals of each coil group, whether there is a foreign object in the detection region corresponding to the coil array. In this way, when a foreign object is detected, the foreign object can be removed in time, thereby improving wireless charging safety and charging efficiency.

In addition, in this technical solution, the abnormal-value threshold is dynamically determined based on the obtained induction signals, and foreign object detection is performed based on the abnormal-value threshold. In this way, an inherent error (for example, an error caused by an interference factor such as a power adjustment, a concrete layer, or a protective housing) can be incorporated into the abnormal-value threshold, so that an anti-interference capability and environment adaptability of foreign object detection can be improved.

In addition, in this technical solution, foreign object detection is performed based on symmetry of the detection coils in a unit of a coil group. This can reduce algorithm complexity.

In addition, in this technical solution provided in an embodiment, the foreign object detection circuit may provide the alternating current excitation signal to each detection coil, that is, use excitation source-based detection. In this way, strength of the induction signal of each detection coil is mainly subject to an excitation source. This can reduce impact of the environmental magnetic field on detection accuracy, and further improve accuracy of foreign object detection.

In addition, in the foregoing technical solution, when it is determined that there is no foreign object, the signal threshold is determined based on the induction signals obtained in the first time period, and subsequent foreign object detection is performed based on the signal threshold, thereby increasing a processing speed.

According to the foreign object detection method provided in an embodiment, after the signal threshold is determined, the signal threshold may be updated in a subsequent detection process, so that environment adaptability of foreign object detection can be further improved.

Figure 11:
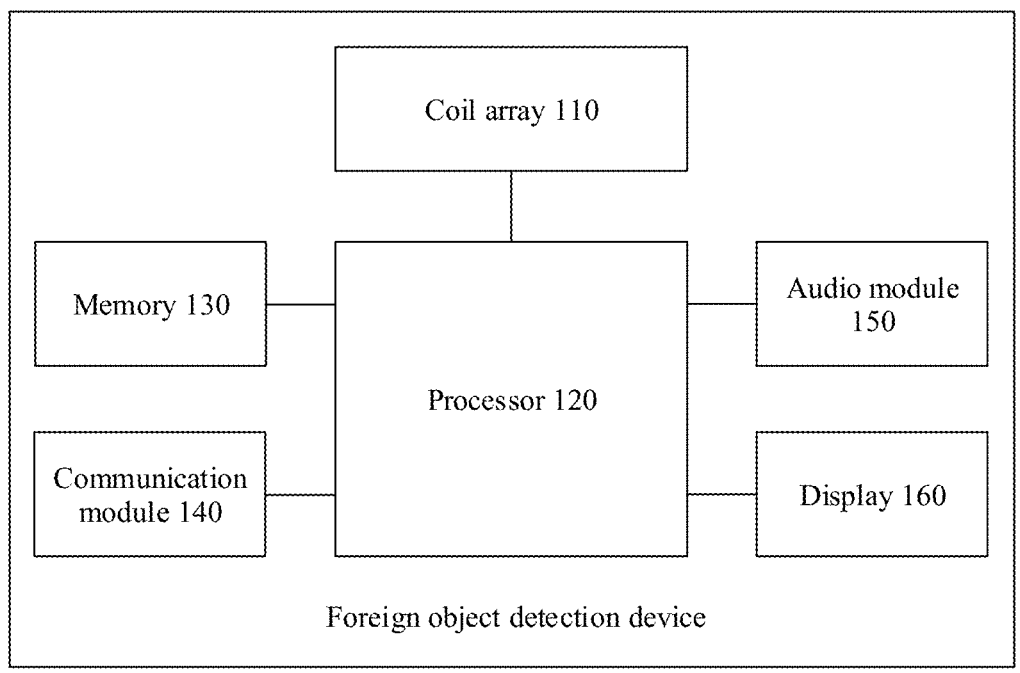
FIG. 11 is a schematic diagram of a structure of a foreign object detection device according to an embodiment of this application.

An embodiment of this application further provides a foreign object detection device. FIG. 11 is a schematic diagram of a structure of a foreign object detection device according to an embodiment of this application.

As shown in FIG. 11, the foreign object detection device may include a coil array 110, a processor 120, a memory 130, a communication module 140, an audio module 150, and a display 160.

It can be understood that, a structure shown in an embodiment of this application does not constitute a limitation on the foreign object detection device. In some other embodiments of this application, the foreign object detection device may include more or fewer components than those shown in the figure, or combine some components, or split some components, or have different component arrangements. The components shown in the figure may be implemented by using hardware, software, or a combination of software and hardware.

For a structure of the coil array 110, refer to the related descriptions in the foregoing embodiments. Details are not described herein.

The processor 120 may be a central processing unit (CPU), or may be another general-purpose processor 120, a digital signal processor (DSP) 120, an application-specific integrated circuit (ASIC), a field programmable gate array (FPGA), or another programmable logic device, a discrete gate or a transistor logic device, a discrete hardware component, or the like. The general-purpose processor 120 may be a microprocessor 120, or the processor 120 may be any conventional processor 120. Some or all of the foregoing circuit modules of the foreign object detection circuit may be integrated into the processor 120.

The memory 130 is configured to store instructions and data (for example, induction signals collected by a signal collection unit). The memory 130 may include a non-persistent memory 130, a random access memory 130 (RAM), a non-volatile memory, and/or another form in a computer-readable medium, for example, a read-only memory 130 (ROM) or a flash memory (flash RAM).

The memory 130 may include a volatile memory and/or a non-volatile memory. The non-volatile memory may be a read-only memory (ROM), a programmable read-only memory (PROM), an erasable programmable read-only memory 130 (EPROM), an electrically erasable programmable read-only memory (EEPROM), or a flash memory (flash). The volatile memory may be a random access memory (RAM) that is used as an external cache. By way of illustration but not limitation, various forms of RAMs may be used, such as a static random access memory (SRAM), a dynamic random access memory (DRAM), a synchronous dynamic random access memory (SDRAM), and a double data rate synchronous dynamic random access memory (DDR SDRAM).

The foreign object detection device may communicate with a power transmitting apparatus, a power receiving apparatus, and/or another device by using the communication module 140. The communication module 140 may provide wireless communication solutions that are applied to a foreign object detection apparatus, including a wireless local area network (WLAN) (for example, a wireless fidelity (Wi-Fi) network), Bluetooth (BT), a global navigation satellite system (GNSS), frequency modulation (FM), near field communication (NFC), and infrared (IR).

The audio module 150 may provide a sound signal, and the foreign object detection device may report an alarm in a voice manner in the foregoing method embodiments by using the audio module 150.

The display 160 is configured to display an image, a video, and the like. For example, the foreign object detection device may display a location of a foreign object in a coil array by using the display 160.

The display 160 includes a display panel. The display panel may be a liquid crystal display (LCD), an organic light-emitting diode (OLED), an active-matrix organic light-emitting diode (AMOLED), a flexible light-emitting diode (FLED), a mini LED, a micro LED, a quantum dot light-emitting diode (QLED), or the like.

The foreign object detection device provided in an embodiment may perform the foregoing method embodiments. An implementation principle and a technical effect thereof are similar to those of the foregoing method embodiments, and details are not described herein.

An embodiment of this application further provides a computer-readable storage medium. A computer program is stored on the computer-readable storage medium. When the computer program is executed by a processor, the method in the foregoing method embodiments is implemented.

An embodiment of this application further provides a computer program product. When the computer program product runs on an electronic device, the electronic device is enabled to perform the method in the foregoing method embodiments when executing the computer program product.

An embodiment of this application further provides a chip system, including a processor. The processor is coupled to a memory, and the processor executes a computer program stored in the memory, to implement the method in the foregoing method embodiments. The chip system may be a single chip or a chip module including a plurality of chips.

All or some of the foregoing embodiments may be implemented by using software, hardware, firmware, or any combination thereof When software is used to implement the embodiments, all or some of the embodiments may be implemented in a form of a computer program product. The computer program product includes one or more computer instructions. When the computer program instructions are loaded and executed on the computer, the procedure or functions according to embodiments of this application are all or partially generated. The computer may be a general-purpose computer, a dedicated computer, a computer network, or another programmable apparatus. The computer instructions may be stored in a computer-readable storage medium, or may be transmitted through the computer-readable storage medium. The computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (SSD)), or the like.

Persons of ordinary skill in the art may understand that all or some of the procedures of the methods in the embodiments may be implemented by a computer program instructing related hardware. The program may be stored in the computer-readable storage medium. When the program is executed, the procedures in the method embodiments may be included. The storage medium may include any medium that can store program code, such as a ROM or a random access memory RAM, a magnetic disk, or a compact disc.

Names or numbers of operations in this application do not mean that the operations in the method procedure need to be performed in a time/logical sequence indicated by the names or numbers. An execution sequence of the operations in the procedure that have been named or numbered can be changed based on a technical objective to be achieved, provided that same or similar technical effects can be achieved.

In the foregoing embodiments, the description of each embodiment has respective focuses. For a part that is not described in detail in an embodiment, refer to related descriptions in other embodiments.

In the embodiments provided in this application, it should be understood that the disclosed apparatus/device and method may be implemented in other manners. For example, division into the module or unit is merely logical function division and may be other division in an embodiment. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

It should be understood that, in the description of the specification and the appended claims in this application, the terms "include", "have", and any variants thereof are intended to cover non-exclusive inclusions. For example, a process, method, system, product, or device that includes a series of operations or modules is not necessarily limited to those clearly listed operations or modules, and may include other operations or modules that are not clearly listed or are inherent to the process, method, product, or device.

In the descriptions of this application, "/" represents an "or" relationship between associated objects unless otherwise specified. For example, A/B may represent A or B. The term "and/or" in this application represents only an association relationship for describing associated objects and represents that three relationships may exist. For example, A and/or B may represent the following three cases: Only A exists, both A and B exist, and only B exists, where A and B may be singular or plural.

In addition, in descriptions of this application, unless otherwise specified, "a plurality of" means two or more than two. "At least one of the following" or a similar expression thereof means any combination of these items, including any combination of a single item or a plurality of items. For example, at least one of a, b, or c may represent a, b, c, a and b, a and c, b and c, or a and b and c. Herein, a, b, and c may be singular or plural.

As used in the specification and claims of this application, the term "if" may be interpreted as "when", "once", "in response to determining", or "in response to detecting" depending on the context. Similarly, the phrase "if it is determined" or "if the [described condition or event] is detected" may be interpreted as meaning "once determined" or "in response to determining" or "once the [described condition or event] is detected" or "in response to detecting the [described condition or event]" depending on the context.

In addition, in the description of the specification and the appended claims in this application, the terms "first", "second", "third", and the like are intended to distinguish between similar objects but do not necessarily indicate an order or sequence. It should be understood that the data used in such a way are interchangeable in appropriate circumstances, so that the embodiments described herein can be implemented in other orders than the content illustrated or described herein.

Referring to "an embodiment" or "some embodiments" or the like in the specification of this application means that one or more embodiments of this application include a feature, structure, or characteristic described with reference to the embodiment. Therefore, statements such as "in an embodiment", "in some embodiments", "in some other embodiments", and "in other embodiments" that appear at different places in this specification do not necessarily mean referring to a same embodiment, instead, they mean "one or more but not all of the embodiments", unless otherwise emphasized.

Finally, it should be noted that the foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of embodiments of this application.

What is claimed is:

1. A foreign object detection method performed by a wireless charging system, comprising:
   obtaining an induction signal generated by each detection coil in each of at least one coil group of a coil array of a foreign object detection circuit of a foreign object detection apparatus, wherein each coil group comprises four detection coils separately wound into a rectangle shape, wherein the detection coils in the coil array are arranged in a matrix with even quantities of rows and columns, wherein four detection coils in the coil array symmetrical to each other are located in one coil group, wherein the coil array is divided into four quadrants based on a row center line and a column center line of the coil array, wherein detection coils in a same quadrant have a same wiring structure wound clockwise or counterclockwise, and wiring structures of the detection coils in adjacent quadrants are symmetrical to each other relative to a center line between the adjacent quadrants;
   determining an abnormal-value threshold of each coil group based on induction signals of each coil group and obtained in a first time period which is a preset time period after the induction signals start to be obtained; and
   detecting, based on the abnormal-value threshold and the induction signals of each coil group, whether there is a foreign object in a detection region corresponding to the coil array.

2. The method according to claim 1, wherein the determining the abnormal-value threshold of each coil group based on the induction signals of each coil group and obtained in the first time period comprises:
   determining the abnormal-value threshold of each coil group by using an interquartile range method based on signal values of the induction signals of each coil group obtained in the first time period.

3. The method according to claim 1, wherein there are a plurality of coil groups, and the detecting whether there is the foreign object in the detection region corresponding to the coil array comprises:
   determining, for each coil group based on the abnormal-value threshold of the coil group, whether the induction signals of the coil group have an abnormal value; and
   if the induction signals of each coil group each has an abnormal value or each has no abnormal value, determining that there is no foreign object in the detection region corresponding to the coil array; or
   if induction signals of at least one of the coil groups have an abnormal value, and induction signals of at least one of the coil groups have no abnormal value, determining that there is a foreign object in the detection region corresponding to the coil array.

4. The method according to claim 3, wherein the abnormal-value threshold comprises a first threshold and a second threshold greater than the first threshold, and the determining whether the induction signals of the coil group have an abnormal value comprises:
   determining whether the induction signals of the coil group have a signal value less than the first threshold or greater than the second threshold; and
   if the induction signals of the coil group have a signal value less than the first threshold or greater than the second threshold, determining that the induction signals of the coil group have an abnormal value; or if the induction signals of the coil group have no signal value less than the first threshold or greater than the second threshold, determining that the induction signals of the coil group have no abnormal value.

5. The method according to claim 1, further comprising:
if there is no foreign object in the detection region corresponding to the coil array, determining, for each coil group, a signal threshold of the coil group based on the induction signals of the coil group obtained in the first time period; and
detecting, for at least one second time period after the first time period based on the signal threshold of each coil group and induction signals of each coil group obtained in the second time period, whether there is a foreign object in the detection region corresponding to the coil array.

6. The method according to claim 5, further comprising:
if there is no foreign object in the detection region corresponding to the coil array in the second time period, determining a signal threshold of each coil group based on the induction signals of each coil group obtained in the second time period.

7. The method according to claim 5, wherein if there is no foreign object in the detection region corresponding to the coil array, and the induction signals of each coil group each has no abnormal value, a signal threshold of each coil group is determined based on the induction signals of each coil group obtained in the first time period.

8. The method according to claim 5, wherein there are a plurality of types of signal values for the obtained induction signals of the coil group, and wherein each type of signal value has a corresponding signal threshold.

9. The method according to claim 8, wherein the signal values of the obtained induction signals of the coil group comprise:
an amplitude of each detection coil in the coil group and a phase difference between the detection coils in the coil group, and
wherein the signal threshold of the coil group comprises an amplitude threshold and a phase difference threshold.

10. The method according to claim 5, wherein the determining the signal threshold of the coil group based on the induction signals of the coil group obtained in the first time period comprises:
determining the signal threshold of the coil group by using an averaging method based on the induction signals of the coil group obtained in the first time period.

11. The method according to claim 5, wherein there are a plurality of coil groups, and the detecting whether there is a foreign object in the detection region corresponding to the coil array comprises:
determining, for each coil group based on the signal threshold of the coil group and the induction signals of the coil group obtained in the second time period, whether the induction signals of the coil group have an abnormal value; and
if the induction signals of each coil group each has no abnormal value or each has an abnormal value, determining that there is no foreign object in the detection region corresponding to the coil array; or
if induction signals of at least one of the coil groups have an abnormal value, and induction signals of at least one of the coil groups have no abnormal value, determining that there is a foreign object in the detection region corresponding to the coil array.

12. The method according to claim 11, wherein the determining whether the induction signals of the coil group have an abnormal value comprises:
determining, for each detection coil in the coil group, an absolute value of a difference between an average value of signal values of the induction signal of the detection coil obtained in the second time period and the signal threshold of the coil group; and
if the absolute value corresponding to each detection coil in the coil group is less than or equal to a preset value, determining that the induction signals of the coil group have no abnormal value; or
if an absolute value corresponding to at least one detection coil in the coil group is greater than the preset value, determining that the induction signals of the coil group have an abnormal value.

13. The method according to claim 1, wherein after the wireless charging system starts to transmit power, the method further comprises:
outputting an alternating current excitation signal to each detection coil.

14. The method according to claim 13, wherein the alternating current excitation signal is successively output to all the coil groups; and/or the alternating current excitation signal is successively output to all the detection coils in each coil group.

15. The method according to claim 1, further comprising:
before the wireless charging system starts to transmit power, detecting whether there is a foreign object in the detection region corresponding to the coil array; and
when there is no foreign object in the detection region corresponding to the coil array, controlling the wireless charging system to start to transmit power.

16. A foreign object detection apparatus, applied to a wireless charging system, wherein the foreign object detection apparatus comprises:
a coil array comprising at least one coil group, each coil group comprises four detection coils separately wound into a rectangle shape, the detection coils in the coil array are arranged in a matrix with even quantities of rows and columns, four detection coils in the coil array whose locations are symmetrical to each other are located in one coil group, and each detection coil is electrically connected to a foreign object detection circuit, wherein the coil array is divided into four quadrants based on a row center line and a column center line of the coil array, wherein detection coils in a same quadrant have a same wiring structure wound clockwise or counterclockwise, and wiring structures of the detection coils in adjacent quadrants are symmetrical to each other relative to a center line between the adjacent quadrants, and
the foreign object detection circuit configured to detect, based on an induction signal generated by each detection coil, whether there is a foreign object in a detection region corresponding to the coil array.

17. The apparatus according to claim 16, wherein there are a plurality of coil groups.

18. The apparatus according to claim 16, wherein the foreign object detection circuit comprises an excitation source configured to provide an alternating current excitation signal for the detection coils, and wherein the detection coils are correspondingly connected to the excitation source one by one.

19. The apparatus according to claim 16, wherein turn spacings between the detection coils gradually increase in a direction from an outside to an inner center.

20. The apparatus according to claim 16, wherein the foreign object detection circuit is configured to perform a method comprising:
  obtaining the induction signal generated by each detection coil in each coil group;
  determining an abnormal-value threshold of each coil group based on induction signals of each coil group and obtained in a first time period which is a preset time period after the induction signals start to be obtained; and
  detecting, based on the abnormal-value threshold and the induction signals of each coil group, whether there is a foreign object in the detection region corresponding to the coil array.

21. A wireless charging system, comprising:
  a power transmitting apparatus, and
  a foreign object detection apparatus comprising:
  a coil array comprising at least one coil group, each coil group comprises four detection coils separately wound into a rectangle shape, the detection coils in the coil array are arranged in a matrix with even quantities of rows and columns, four detection coils in the coil array whose locations are symmetrical to each other are located in one coil group, and each detection coil is electrically connected to a foreign object detection circuit, wherein the coil array is divided into four quadrants based on a row center line and a column center line of the coil array, wherein detection coils in a same quadrant have a same wiring structure wound clockwise or counterclockwise, and wiring structures of the detection coils in adjacent quadrants are symmetrical to each other relative to a center line between the adjacent quadrants, and
  the foreign object detection circuit comprising a signal obtaining unit and a signal processing unit, and the signal processing unit is electrically connected to the signal obtaining unit, wherein
  the signal obtaining unit is configured to obtain, under control by the signal processing unit, an induction signal generated by each detection coil in each coil group, and wherein
  the signal processing unit is configured to:
  determine an abnormal-value threshold of each coil group based on induction signals of each coil group obtained in a first time period, and
  detect, based on the abnormal-value threshold and the induction signals of each coil group, whether there is a foreign object in a detection region corresponding to the coil array, wherein the first time period is a preset time period after the induction signals start to be obtained.

22. The wireless charging system according to claim 21, wherein the foreign object detection circuit further comprises an excitation source, wherein the excitation source is electrically connected to the signal processing unit, and wherein the excitation source is configured to output, under control by the signal processing unit, an alternating current excitation signal to each detection coil in each coil group.

* * * * *